(12) United States Patent
Uppu et al.

(10) Patent No.: US 10,989,247 B2
(45) Date of Patent: Apr. 27, 2021

(54) CORRUGATED WASHER FOR USE WITH A CORRUGATED L-FOOT MOUNTING BRACKET FOR MOUNTING SOLAR PANELS TO A ROOF

(71) Applicant: Unirac Inc., Albuquerque, NM (US)

(72) Inventors: Sai Uppu, Albuquerque, NM (US); Todd Ganshaw, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 16/156,121

(22) Filed: Oct. 10, 2018

(65) Prior Publication Data
US 2020/0116191 A1   Apr. 16, 2020

(51) Int. Cl.
| F16B 39/24 | (2006.01) |
| H02S 20/23 | (2014.01) |
| F16B 43/00 | (2006.01) |
| H02S 20/00 | (2014.01) |

(52) U.S. Cl.
CPC .............. *F16B 39/24* (2013.01); *F16B 43/00* (2013.01); *H02S 20/00* (2013.01); *H02S 20/23* (2014.12)

(58) Field of Classification Search
CPC ........ F16B 43/00; F16B 39/24; F16B 29/282; F24S 25/61; H02S 20/00
See application file for complete search history.

(56) References Cited

U.S. PATENT DOCUMENTS

| 1,427,807 | A | * | 9/1922 | Halbleib | ............... | F16B 39/282 |
| | | | | | | 403/230 |
| 2,271,732 | A | * | 2/1942 | Chappuis | ................ | F16B 39/24 |
| | | | | | | 411/158 |
| 4,034,788 | A | * | 7/1977 | Melone | ................... | F16B 39/24 |
| | | | | | | 411/134 |
| 5,494,090 | A | * | 2/1996 | Kejha | ....................... | B60C 7/12 |
| | | | | | | 152/310 |
| 5,685,926 | A | * | 11/1997 | Kejha | ....................... | B60C 7/12 |
| | | | | | | 152/157 |
| 6,224,288 | B1 | * | 5/2001 | Postma | ................. | F16B 5/0241 |
| | | | | | | 403/30 |
| 6,791,501 | B2 | * | 9/2004 | Maeda | ................... | H01Q 1/084 |
| | | | | | | 343/715 |
| 8,070,404 | B1 | * | 12/2011 | Schluter | ............... | F16B 41/002 |
| | | | | | | 411/368 |
| 8,657,545 | B2 | * | 2/2014 | Magno, Jr. | .............. | F16B 7/187 |
| | | | | | | 248/214 |
| 8,943,670 | B2 | * | 2/2015 | Lohr | ...................... | F16B 39/24 |
| | | | | | | 29/525.02 |
| 9,689,411 | B2 | * | 6/2017 | Meine | ...................... | F16B 2/12 |
| 9,819,303 | B2 | * | 11/2017 | Ash | ......................... | F24S 25/61 |
| 10,186,791 | B2 | * | 1/2019 | Meine | ...................... | F16B 2/12 |
| 10,218,306 | B2 | * | 2/2019 | Ash | ......................... | F24S 25/61 |

(Continued)

*Primary Examiner* — Andrew J Triggs
(74) *Attorney, Agent, or Firm* — Lee & Hayes, P.C.

(57) ABSTRACT

A corrugated washer for use with a corrugated L-foot mounting bracket and a structural mounting rail prevents vertical shear at the joint between the rail and the corrugated L-foot bracket when mounting photovoltaic modules (i.e., solar panels) to a roof of a building or other structure. The design locks the T-bolt from falling off the rail slot, and always aligns the T-bolt in the correct orientation and prevents back-rotation. The corrugations on the washer and L-foot help for making height adjustments, too.

19 Claims, 34 Drawing Sheets

(56) References Cited

U.S. PATENT DOCUMENTS

| | | | |
|---|---|---|---|
| 2006/0133890 A1* | 6/2006 | Etoile | F16C 11/0614 403/122 |
| 2015/0052712 A1* | 2/2015 | Markiewicz | H02S 20/23 24/569 |
| 2018/0062571 A1* | 3/2018 | Ash | H02S 40/36 |

* cited by examiner

CORRUGATED WASHER FOR USE WITH A CORRUGATED L-FOOT MOUNTING BRACKET FOR MOUNTING SOLAR PANELS TO A ROOF

BACKGROUND OF THE INVENTION

The present invention relates to structures and methods for mounting one or more photovoltaic modules (i.e., solar panels) to a roof of a house or building, or other structure, using components made of stainless steel and/or aluminum alloys (which can be anodized). A problem with prior art joints between structural rails and mounting brackets (e.g., L-foot mounting brackets) is that excessive vibrations, aging, or improper installation torque can result in vertical slippage of the joint due to loosening of the attachment hardware (e.g., T-bolt) when the joint is subjected to shear forces due to wind loads, dead weight, etc. acting on the solar panels. Also, loosening of the hardware and vibrations can result in back-rotation of the T-bolt to a point where the head of the T-bolt can completely pull out of the slot in the rail, resulting in catastrophic failure of the structure. Finally, it is desirable to have a vertical height adjustment in the mounting bracket, to accommodate non-uniform roof heights.

SUMMARY OF THE INVENTION

A corrugated washer is used with a corrugated L-foot mounting bracket and a structural mounting rail for preventing vertical shear at the joint between the rail and the corrugated L-foot bracket, when mounting photovoltaic modules (i.e., solar panels) to a roof of a building or other structure. The design locks the T-bolt from falling off the rail slot, and always aligns the T-bolt in the correct orientation and cannot back-rotate. The corrugations on the washer and L-foot help for making height adjustments, too.

DETAILED DESCRIPTION OF THE INVENTION

The present invention relates to structures and methods for mounting one or more photovoltaic modules (i.e., solar panels) to a roof of a house or building, or other structure, using components made of stainless steel and/or aluminum alloys (which can be anodized).

Figure 1:
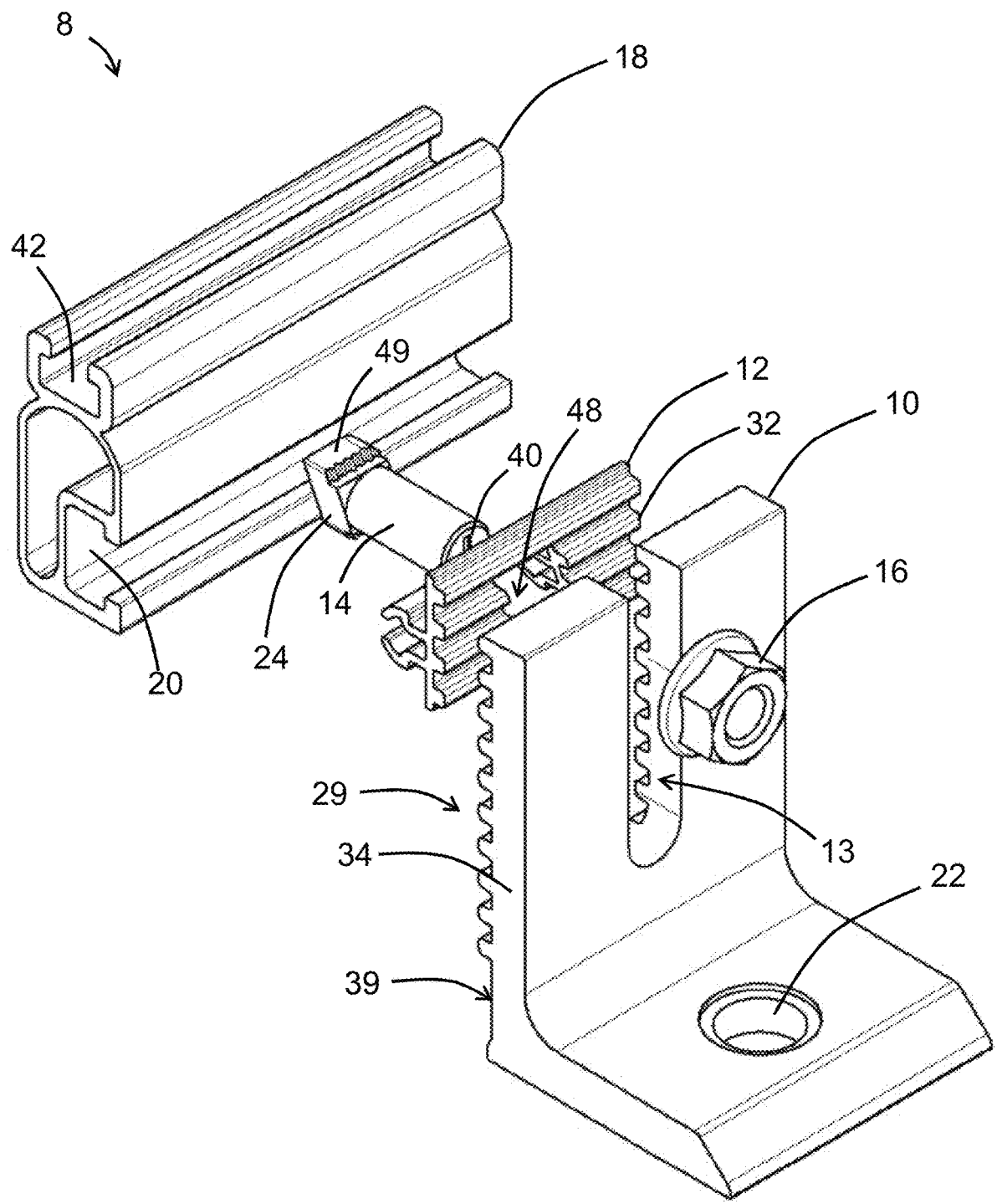
FIG. 1 shows an exploded perspective view of a first embodiment of an assembly comprising a corrugated washer for use with a corrugated L-foot mounting bracket and a solar panel mounting rail, according to the present invention.

FIG. 1 shows an exploded perspective view of a first embodiment of an assembly 8 comprising a corrugated washer 12 for use with a corrugated L-foot mounting bracket 10 and a solar panel mounting rail 18, according to the present invention. L-foot mounting bracket 10 is attached to a roof or other structure using a lag screw (not shown) passing through aperture 22. Corrugated washer 12 is disposed in-between L-foot bracket 10 and rail 18; and T-bolt 14 passes through aperture 48 in corrugated washer 12 and through U-shaped channel 13 in L-foot 10 (which provides for vertical height adjustment of the mounting rail 18 relative to the fixed L-foot 10 in discrete (fixed) height increments defined by the spacing between adjacent corrugations 29. T-bolt 14 (with T-shaped head 24) attaches structural mounting rail 18 to L-foot bracket 10 by inserting shoulders 49, 49' (FIG. 2) of the head 24 of T-bolt 14 into the lower horizontal channel 20 of rail 18, and by tightening nut 16 on the threaded shaft of bolt 14. Horizontal, parallel corrugations 32 in washer 12 engage with (interlock with) mating horizontal, parallel corrugations 29 on the front side of L-foot bracket 10, which prevents any vertical slippage of rail 18 relative to L-foot 10. The width of washer 12 can be as wide as L-foot 10, or it can be less than the width of L-foot 10. Corrugations 29 protrude perpendicularly from the front surface 39 of the vertical leg (leg) 34 of L-foot 10. Washer 12 prevents T-bolt 14 from falling off of rail 18; prevents back-rotation of the T-bolt; and properly aligns the T-bolt in the correct orientation before and after installation. The interlocking corrugations on the washer 12 and L-foot bracket 10 provide for vertical height adjustment by engaging different overlapping sections of opposing corrugations.

Figure 2:
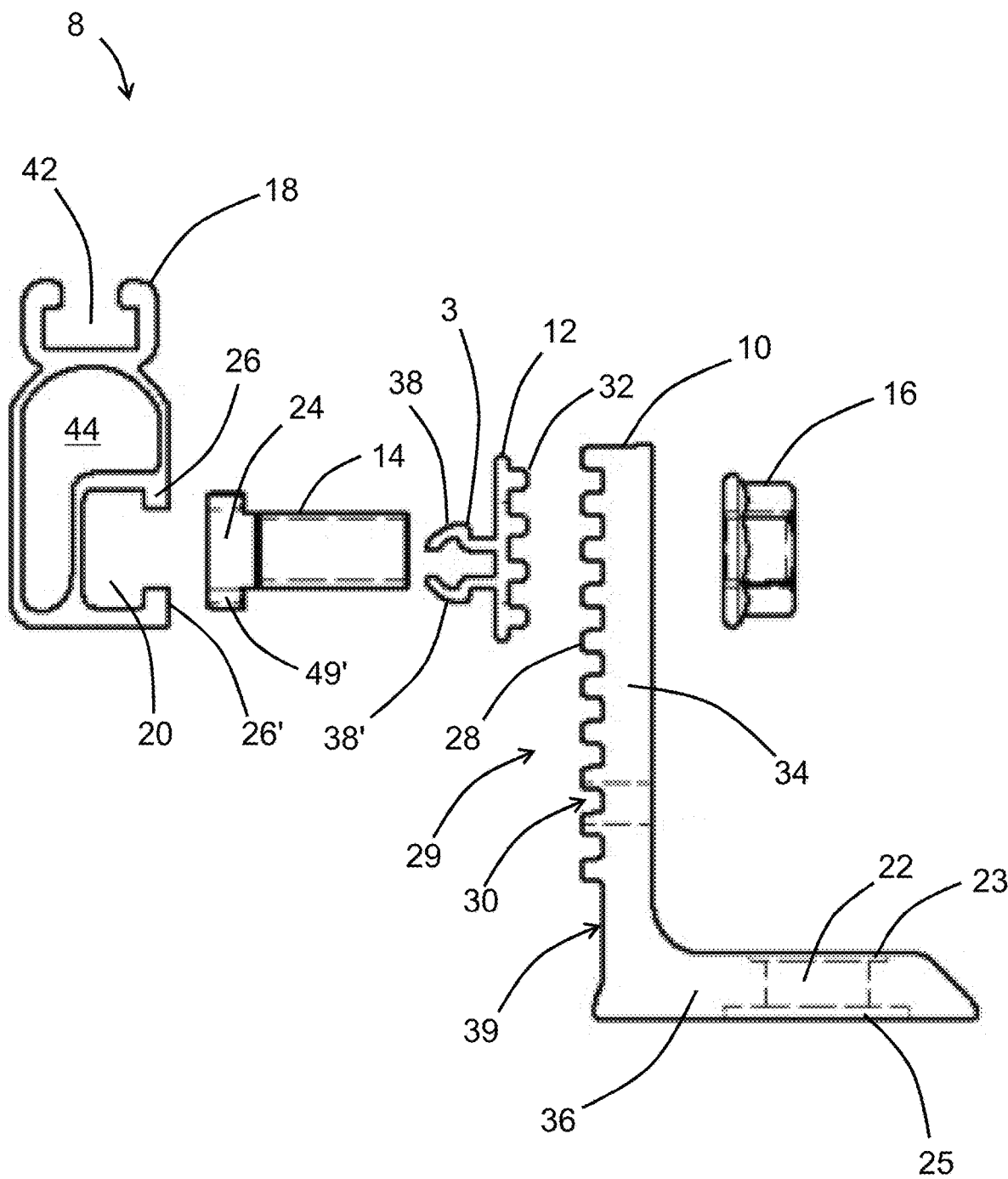
FIG. 2 shows an exploded side elevation view of a first embodiment of an assembly comprising a corrugated washer for use with a corrugated L-foot mounting bracket and a solar panel mounting rail, according to the present invention.

FIG. 2 shows an exploded side elevation view of a first embodiment of an assembly 8 comprising a corrugated washer 12 for use with a corrugated L-foot mounting bracket 10 and a solar panel mounting rail 18, according to the present invention. L-foot bracket 10 comprises a horizontal base portion 36 and an integral vertical leg 34 that has a plurality of uniformly-spaced, horizontal, parallel corrugations 29 (comprising ridges (teeth) 28 and corresponding valleys 30) that span the width of L-foot 10 and that are disposed on the frontside 39 of L-foot 10. Corrugated washer 12 has a plurality of uniformly-spaced, horizontal, parallel corrugations 32 that span the width of washer 12, and that match the spacing and dimensions of corresponding ridges 28 and valleys 30 of L-foot 10. In this example, corrugations 29 and 32 are square with rounded corners. When the ridges of corrugations 32 of washer 12 are engaged with the corresponding valleys 30 of L-foot 10, the shear strength of the keyed, interlocked configuration is greatly enhanced; thereby preventing any vertical slippage of rail 18 relative to L-foot 10 when vertical forces (e.g., wind loads) are imposed on solar panels (not shown) mounted to rail 18. This enhanced shear strength of the joint is a critical feature to have when the nut 16 on T-bolt 14 has inadvertently loosened up due to aging, excessive vibrations, or use of an improper installation torque.

Referring still to FIG. 2, washer 12 comprises a pair of prongs 38 and 38' that are inserted and snap into channel 20 for temporarily holding washer 12 in place until nut 16 is tightened on T-bolt 14. T-head 24 of T-bolt 14 is inserted into horizontal lower channel 20 of rail 18 and then rotated 90 degrees so that shoulders 49, 49' of T-head 24 are caught and held in place by flanges (shoulders) 26 and 26' of channel 20. Mounting rail 18 has an interior void space 44; and a horizontal, upper channel 42 (also indicated in FIG. 1) that receives T-bolts and other mounting hardware for clamping the solar panels (not shown) onto rail 18.

Referring still to FIG. 2, corrugated washer 12 can have four corrugations 32, but other number of corrugations can be used (e.g., 1, 2, 3, 4, 5, 6, 7, 8, 9, 10). In general, the shape of the corrugations 29 and 32 can be square, tapered, rectangular, sinusoidal (e.g., wavy), gear-tooth shaped, or triangular (sawtooth) shaped, or combinations thereof. Note that prongs 38 and 38' are not centered vertically on washer 12; but, rather, are offset towards the lower ½ of washer 12. This places the upper prong 38 at approximately the vertical center of washer 12. Aperture 22 in base 36 is surrounded by a concentric, upper annular recess (counterbore) 23 located on the upper side of base 36, and by a concentric, lower annular recess (counterbore) 25 located on the lower side of base 36. Aperture 22 and upper/lower counterbores 23 and 25, respectively, cooperate to securely hold an I-shaped elastomeric (e.g., rubber or EDPM) grommet (see FIG. 23) that is used for providing water sealing of the lag screw (not shown).

Figure 3:
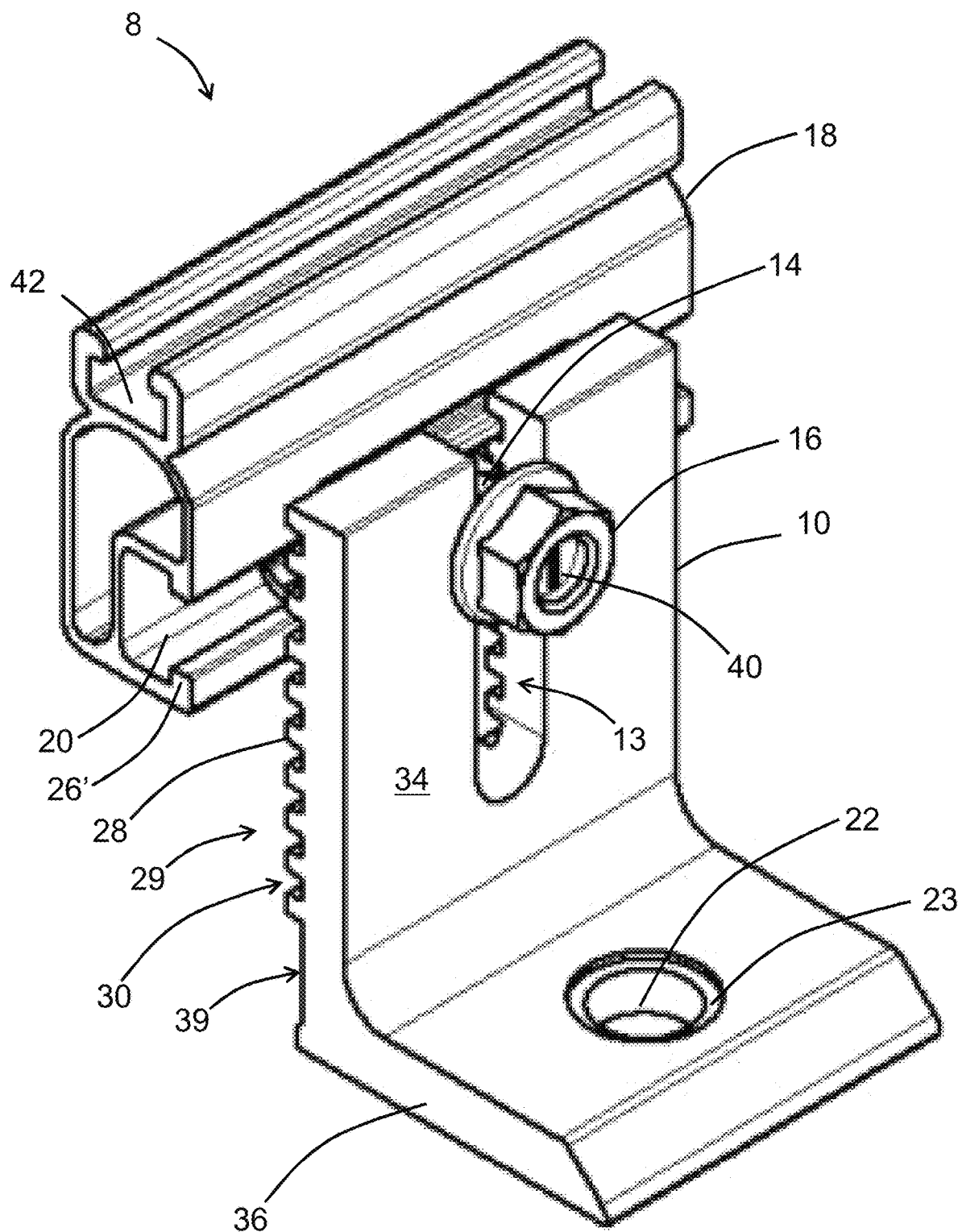
FIG. 3 shows a perspective view of a first embodiment of an assembly comprising a corrugated washer for use with a corrugated L-foot mounting bracket and a solar panel mounting rail, according to the present invention.

FIG. 3 shows a perspective view of a first embodiment of an assembly 8 comprising a corrugated washer 12 (FIG. 2) for use with a corrugated L-foot mounting bracket 10 and a solar panel mounting rail 18, according to the present invention, after tightening nut 16 on T-bolt 14. The position of mounting rail 18 is height-adjustable by adjusting the vertical position of T-bolt 14 and nut 16 along U-shaped height adjustment channel 13. The distal end of T-bolt 14 has a slot or visual marking (e.g., stripe) 40 disposed across the diameter of the bolt's shaft 14, which is used to visually align the rotational orientation of the T-bolt 14 with respect to the horizontal channel 20 in mounting rail 18 (which aids in the proper rotational positioning of the shoulders 49, 49' of T-head 24 of T-bolt 14 for engagement with the shoulders 26, 26' of channel 20).

Figure 4:
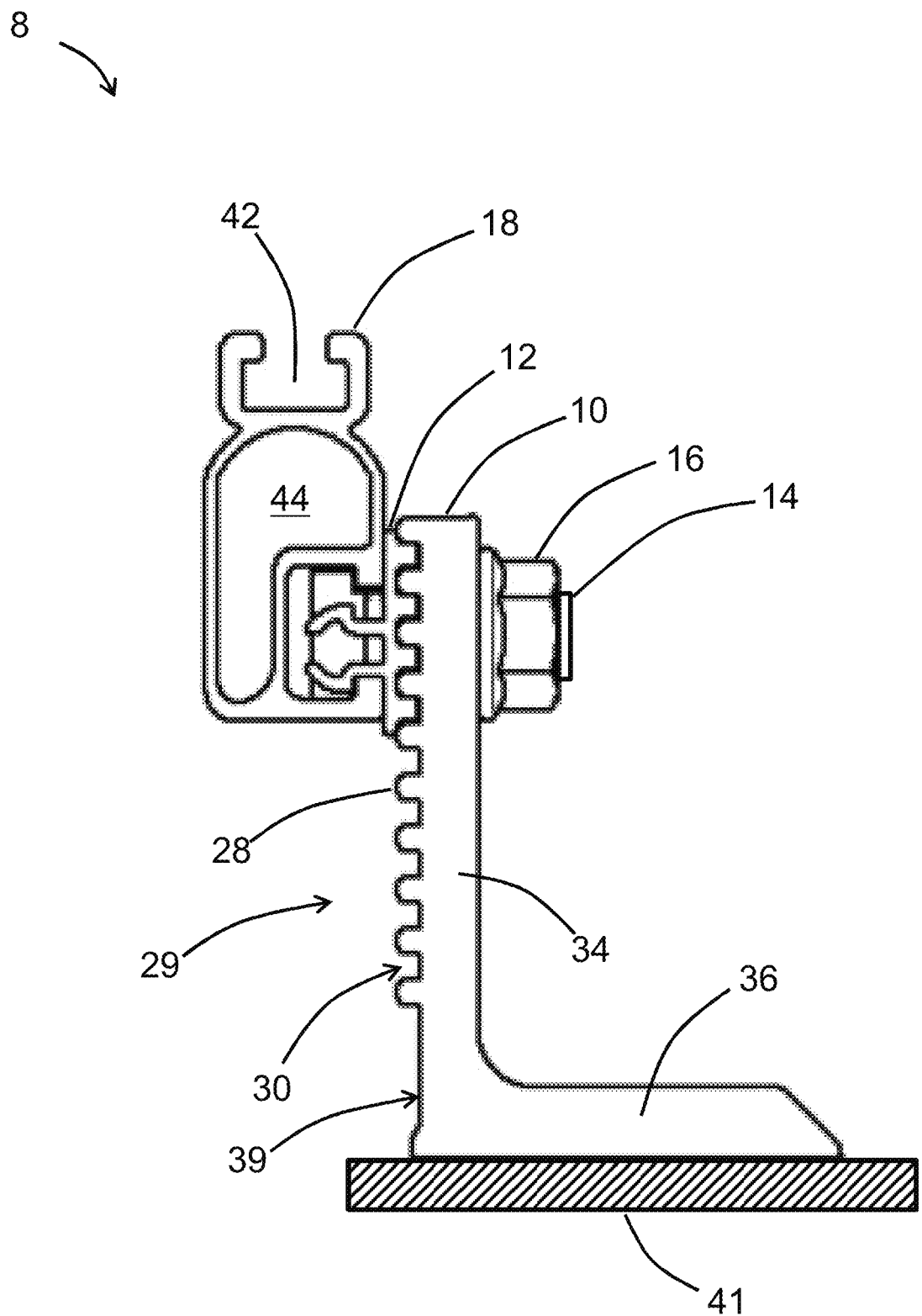
FIG. 4 shows a side elevation view of a first embodiment of an assembly comprising a corrugated washer for use with a corrugated L-foot mounting bracket and a solar panel mounting rail, according to the present invention.

FIG. 4 shows a side elevation view of a first embodiment of an assembly 8 comprising a corrugated washer 12 for use with a corrugated L-foot mounting bracket 10 and a solar panel mounting rail 18, according to the present invention. The corrugations 32 (FIG. 2) of washer 12 are engaged (interlocked) with mating corrugations (teeth or ridges 28 and valleys 30) on L-foot bracket 10, which prevents vertical (shear) slippage of rail 18 relative to L-foot 10. Base 36 of L-foot 10 is mounted to roof structure 41 with a lag screw (not shown).

Figure 5:
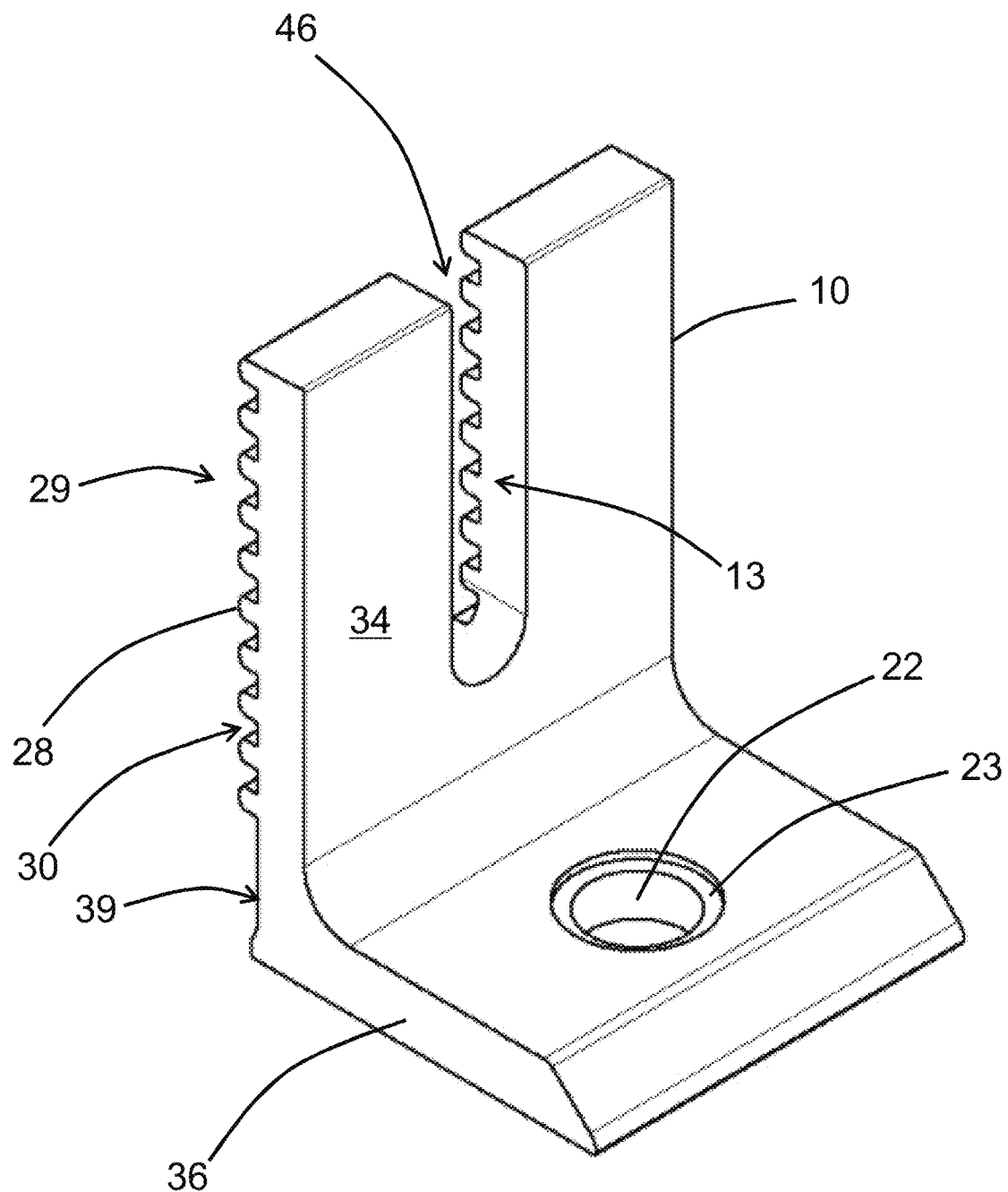
FIG. 5 shows a front perspective view of a first embodiment of a corrugated L-foot mounting bracket, according to the present invention.

FIG. 5 shows a front perspective view of a first embodiment of a corrugated L-foot mounting bracket 10, according to the present invention. L-foot 10 comprises a horizontal base portion 36 and an integral vertical leg 34 that contains a plurality of uniformly-spaced, horizontally-oriented, parallel corrugations 29 with ridges 28 and valleys 30 located on the front side 39 of vertical leg 34. U-shaped vertical channel 13 is open at the top 46, for accepting T-bolt 14 (not shown). Aperture 22 in base 36 is surrounded by a concentric, upper annular recess (counterbore) 23 located on the upper side of base 36.

Figure 6:
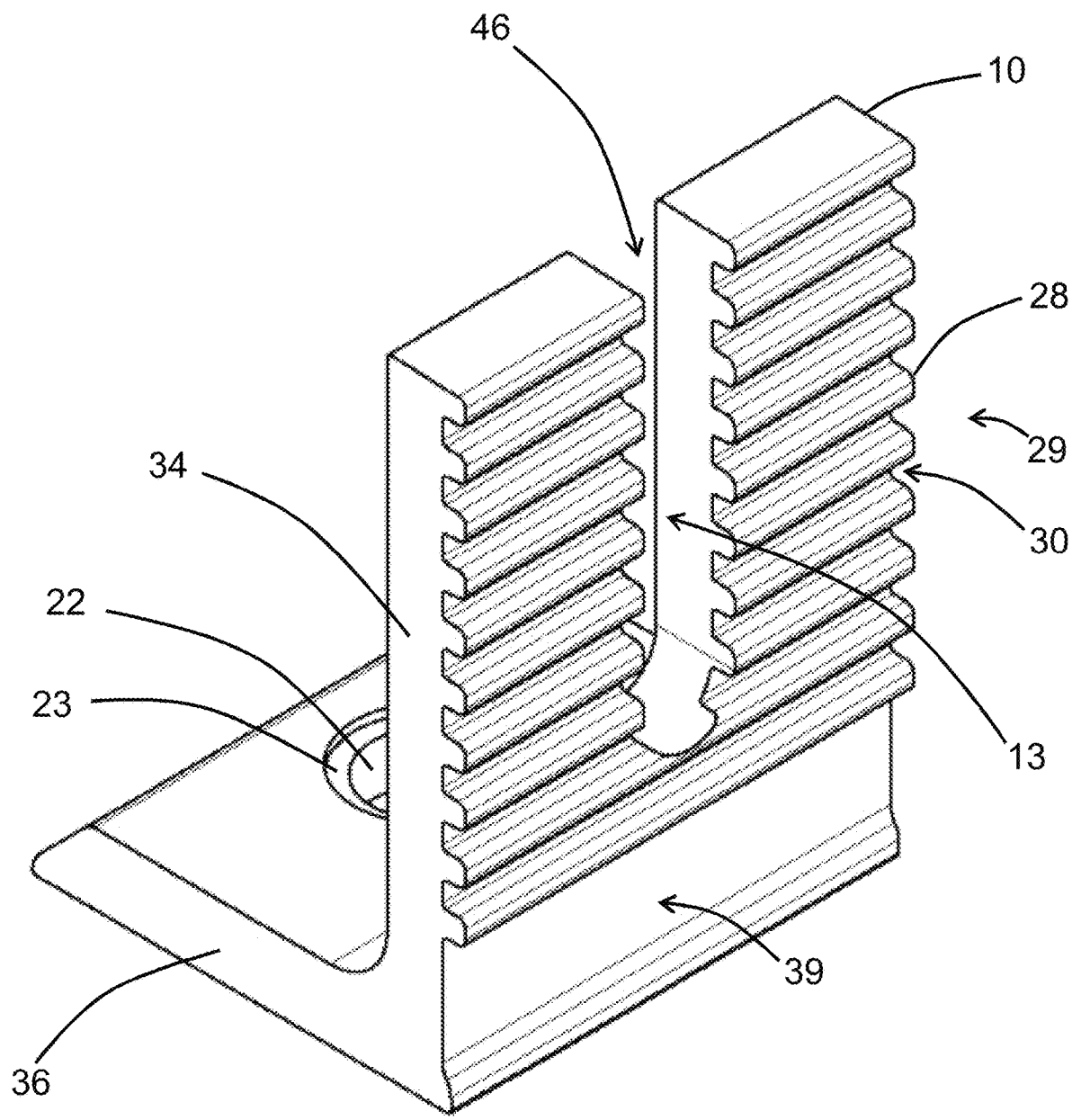
FIG. 6 shows a rear perspective view of a first embodiment of a corrugated L-foot mounting bracket, according to the present invention.

FIG. 6 shows a rear perspective view of a first embodiment of a corrugated L-foot mounting bracket 10, according to the present invention. L-foot 10 comprises a horizontal base portion 36 and an integral vertical leg 34 that contains a plurality of uniformly-spaced, horizontally-oriented, parallel corrugations 29 with ridges 28 and valleys 30. U-shaped vertical channel 13 is open at the top 46, for accepting T-bolt 14 (not shown). Aperture 22 in base 36 is surrounded by a concentric, upper annular recess (counterbore) 23 located on the upper side of base 36.

Figure 7:
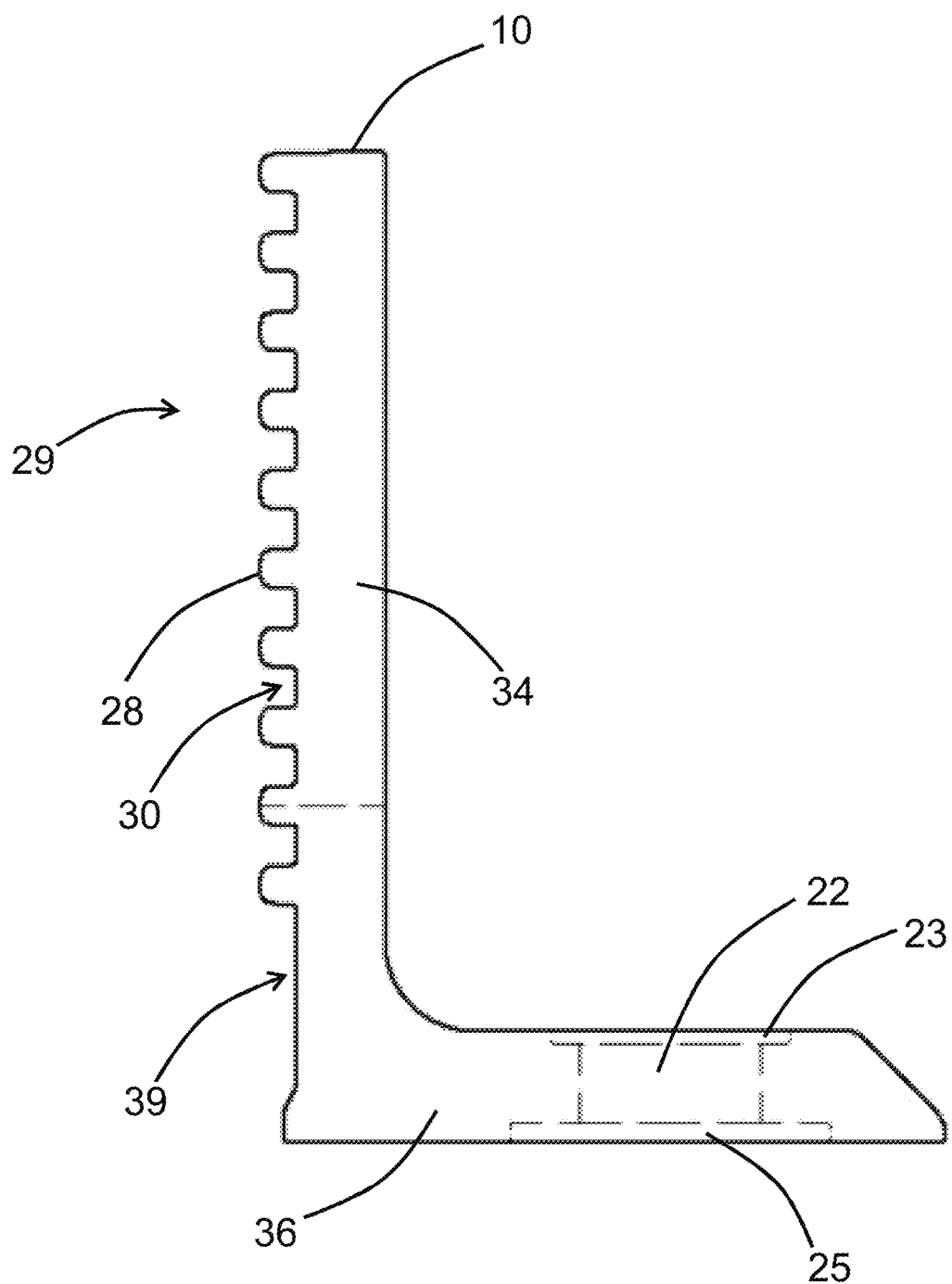
FIG. 7 shows a side elevation view of a first embodiment of a corrugated L-foot mounting bracket, according to the present invention.

FIG. 7 shows a side elevation view of a first embodiment of a corrugated L-foot mounting bracket 10, according to the present invention. L-foot 10 comprises a horizontal base portion 36 and an integral vertical leg 34 that contains a plurality of uniformly-spaced, horizontally-oriented, parallel corrugations 29 with ridges 28 and valleys 30. Aperture 22 in base 36 is surrounded by a concentric, upper annular recess (counterbore) 23 located on the upper side of base 36, and by a concentric, lower annular recess 25 located on the lower side of base 36. In this first embodiment, corrugations 29 are located on the outer (outside-facing) front surface 39 of the vertical leg 34 of L-foot 10. The number of corrugations 29 on L-foot 10 can equal ten, but can also be other numbers (e.g., 1, 2, 3, 4, 5, 6, 7, 8, 9, 10, 11, 12, 13, 14, 15, 16, 17, 18, 19, 20, or more).

Figure 8A:
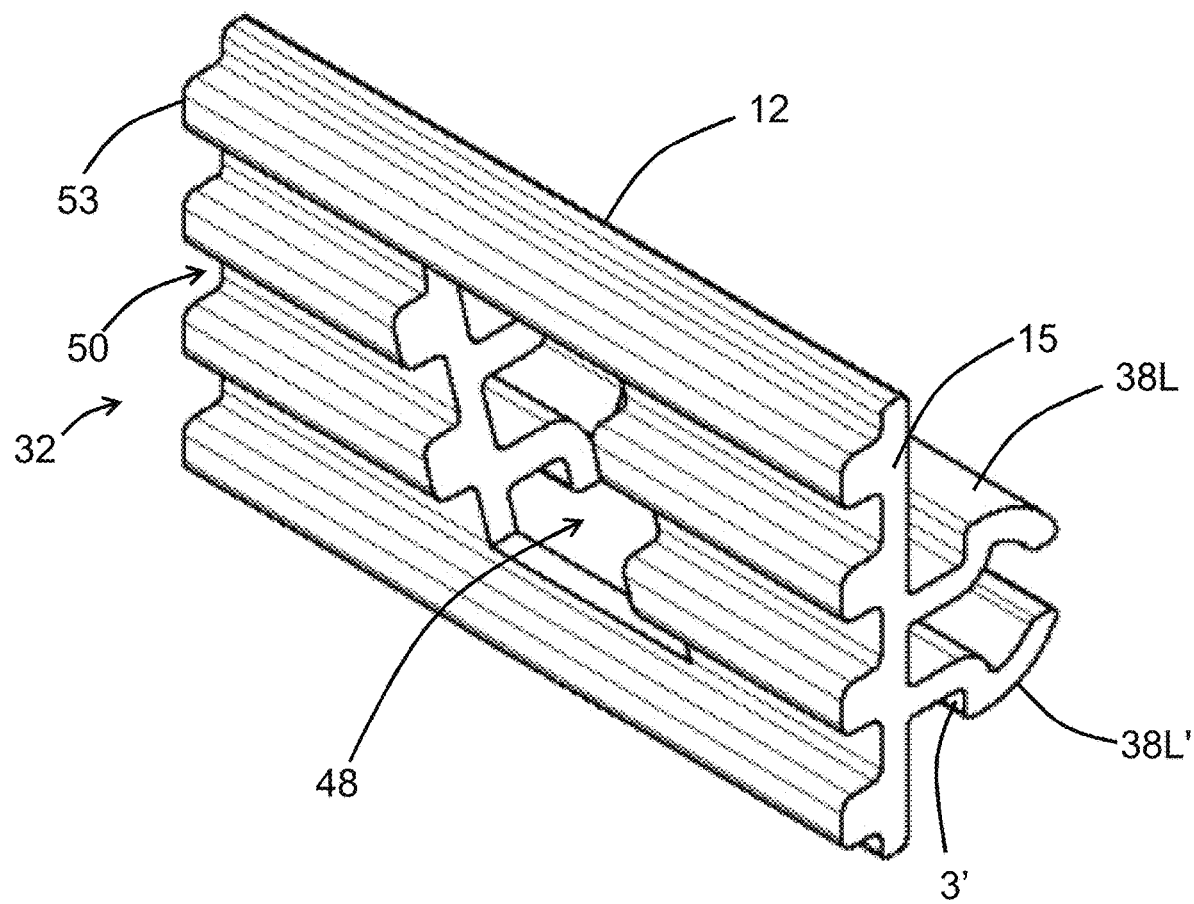
FIG. 8A shows a front perspective view of a first embodiment of a corrugated washer, according to the present invention.
Figure 8B:
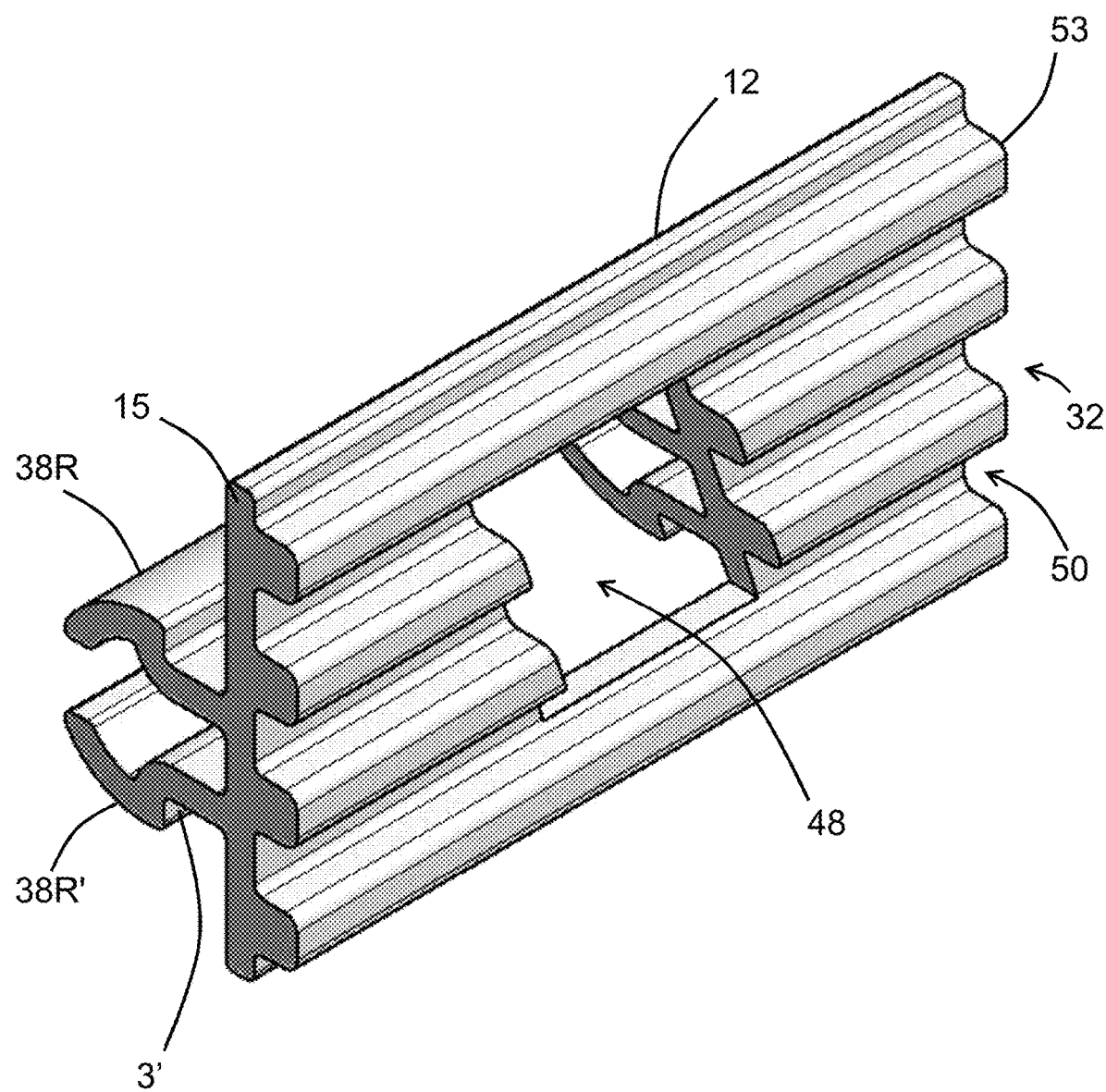
FIG. 8B shows a shaded, front perspective view of a first embodiment of a corrugated washer, according to the present invention.

FIGS. 8A and 8B show front perspective views of a first embodiment of a corrugated washer 12, according to the present invention. Washer 12 comprises a vertically-oriented flat plate 15 with a plurality of uniformly-spaced, horizontal, parallel corrugations 32 on one side, forming valleys 50 in-between adjacent ridges 53. Corrugated washer 12 can have four corrugations 32, but other number of corrugations can be used (e.g., 1, 2, 3, 4, 5, 6, 7, 8, or more). In general, the shape of the corrugations 29 and 32 can be square, rectangular, tapered, sinusoidal (e.g., wavy), triangular (sawtooth) shaped, or gear-tooth shaped, or combinations thereof. Plate 15 further comprises an aperture 48 that passes through the middle of plate 15. Aperture 48 can be circular, rectangular, parallelogram, or rhomboid-shaped. Plate 15 can be rectangular-shaped, circle-shaped, or square-shaped. Extending perpendicularly from plate 15, on the opposite side from corrugations 32, are two pairs of the S-shaped, symmetric, prongs 38, 38' mentioned previously. One pair, identified here as prongs 38L and 38L' are indicated in FIG. 8A, and another pair, identified here as prongs 38R, 38R', are indicated in FIG. 8B. Note that prongs 38 and 38' are not centered vertically on washer 12; but, rather, are offset towards the lower ½ of washer 12. This places the upper prong 38R, 38L at approximately the vertical center of washer 12. Alternatively, the prongs 38 and 38' can be placed symmetrically vertically on washer 12. The prongs 38 and 38' aide in the installation of washer 12, and with the action of gravity the washer cannot fall off of the rail. And, due to symmetry of the prongs 38 and 38', the washer won't fall off of the rail during the height adjustment process. An upper shoulder 3 on upper prong 38 (FIG. 2) engages with upper lip 26 of slot 20 of rail 18, while a lower shoulder 3' on lower prong 38' engages with lower lip 26' of slot 20 of rail 18 to retain washer 12 in slot 20.

Figure 9A:
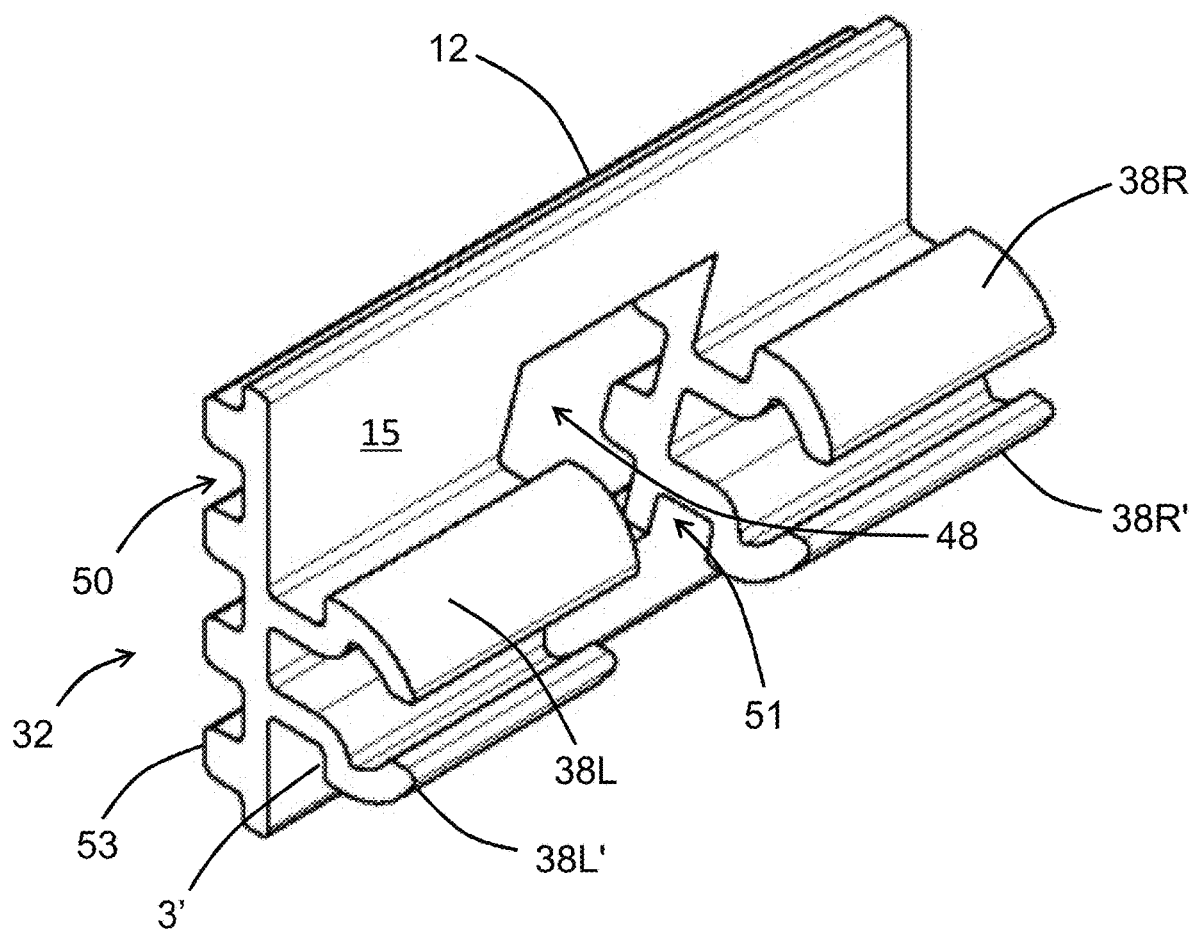
FIG. 9A shows a rear perspective view of a first embodiment of a corrugated washer, according to the present invention.
Figure 9B:
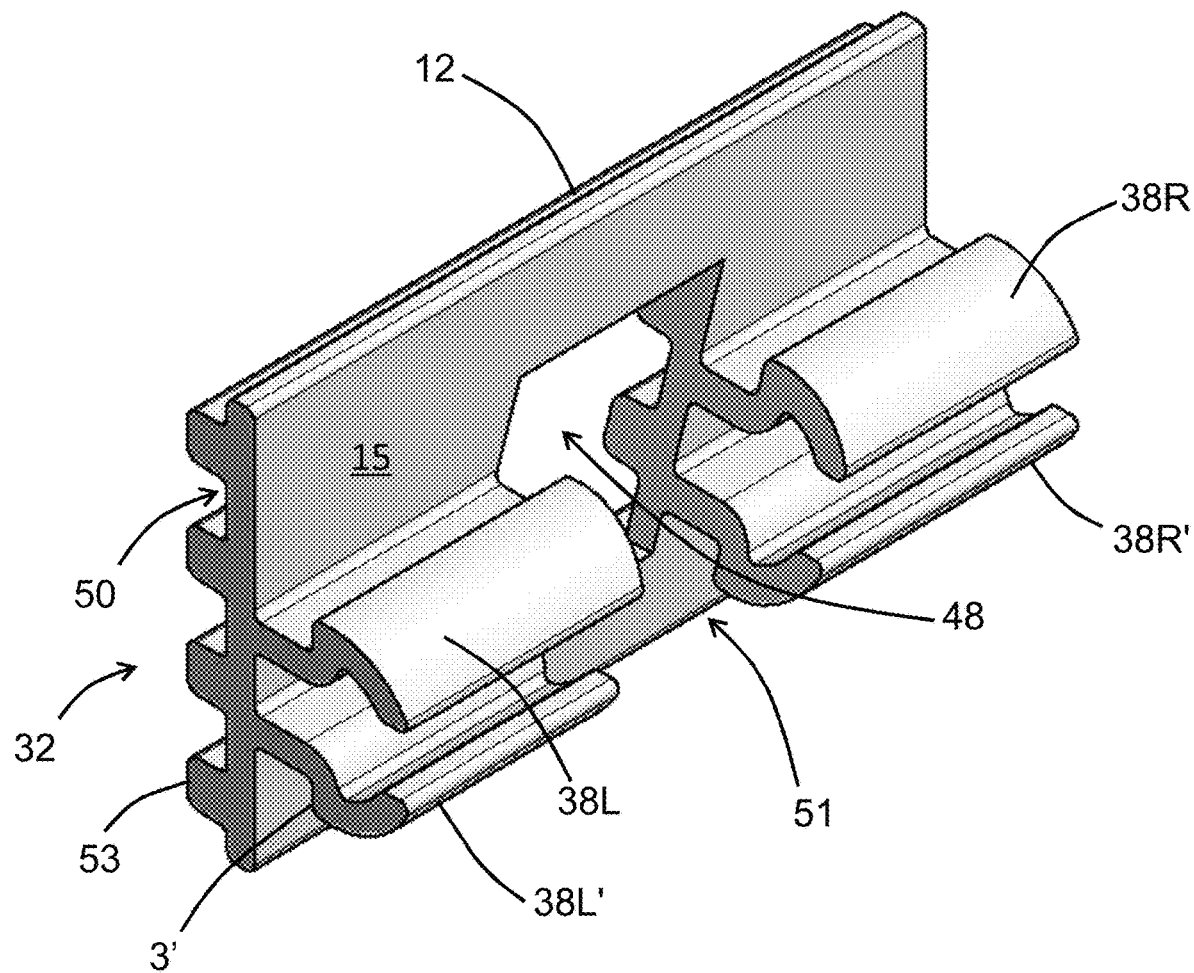
FIG. 9B shows a shaded, rear perspective view of a first embodiment of a corrugated washer, according to the present invention.

FIGS. 9A and 9B show rear perspective views of a first embodiment of a corrugated washer 12, according to the present invention. Washer 12 comprises a vertically-oriented flat plate 15 with a plurality of uniformly-spaced, horizontal, parallel corrugations 32 on one side, forming valleys 50 in-between adjacent ridges 53. Corrugated washer 12 can have four corrugations 32, but other numbers of corrugations can be used (e.g., 1, 2, 3, 4, 5, 6, 7, 8, or more). In general, the shape of the corrugations 29 and 32 can be square, rectangular, tapered, sinusoidal (e.g., wavy), triangular (sawtooth) shaped, or gear-tooth shaped, or combinations thereof. Plate 15 further comprises an aperture 48 that passes through the middle of plate 15. Aperture 48 can be circular, rectangular, parallelogram, or rhomboid-shaped. Plate 15 can be rectangular-shaped, circle-shaped, or square-shaped. Extending perpendicularly from plate 15, on the opposite side from the corrugations 32, are two pairs of S-shaped, symmetric prongs 38R, 38R' and 38L, 38L'. Note again that prongs 38R and 38R' (and, 38L and 38L') are not centered vertically on washer 12; but, rather, are offset towards the lower ½ of washer 12. This places the upper prongs 38L and 38R at approximately the vertical center of washer 12. Note that a gap 51 that exists in-between adjacent pairs of prongs 38L and 38R (and 38L' and 38R') is wide enough to accept the shaft of T-bolt 14. Prongs 38R, 38L, 38R', and 38L' extend to the outer edges (width) of plate 14.

Figure 10:
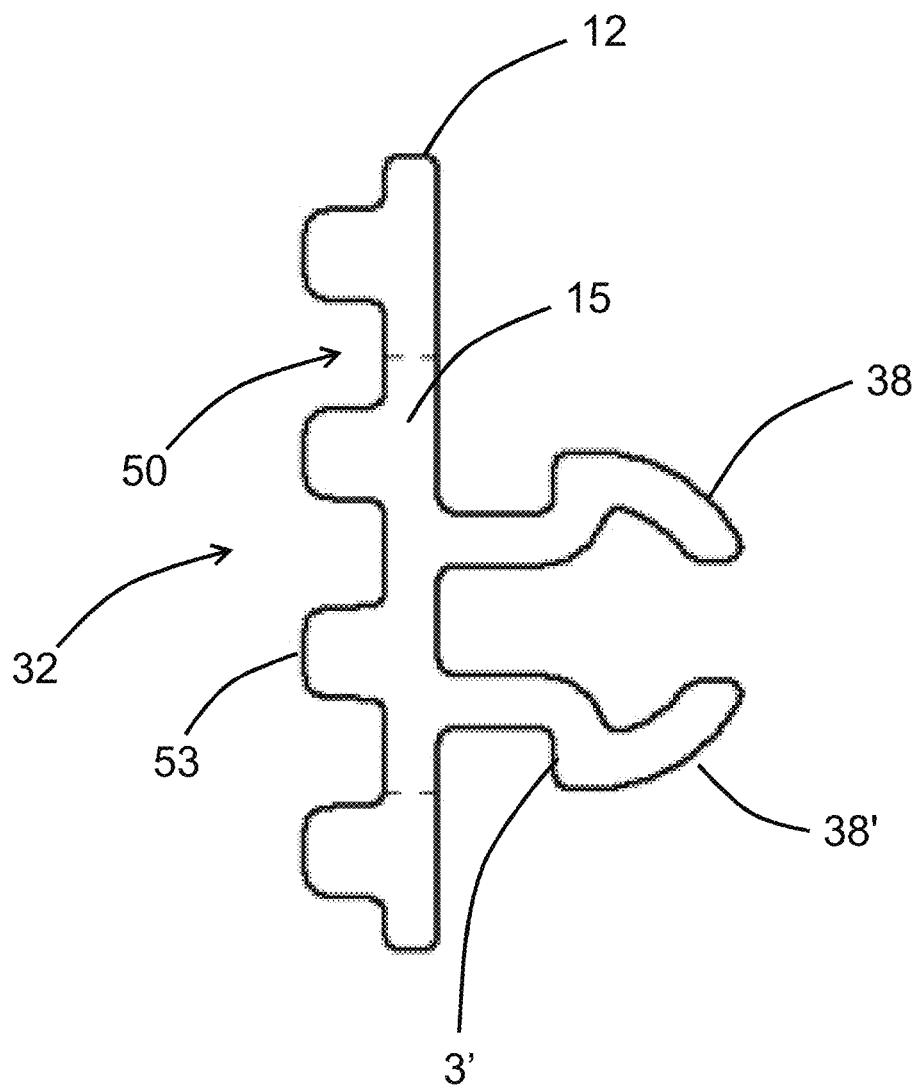
FIG. 10 shows a side elevation view of a first embodiment of a corrugated washer, according to the present invention.

FIG. 10 shows a side elevation view of a first embodiment of a corrugated washer 12, according to the present invention. Washer 12 comprises a vertically-oriented flat plate 15 with a plurality of uniformly-spaced, horizontal, parallel corrugations 32 on one side, forming valleys 50 in-between adjacent ridges 53. Corrugated washer 12 can have four corrugations 32, but other numbers of corrugations can be used (e.g., 1, 2, 3, 4, 5, 6, 7, 8, or more). In general, the shape of the corrugations 29 and 32 can be square, rectangular, tapered, sinusoidal (e.g., wavy), triangular (sawtooth) shaped, or gear-tooth shaped, or combinations thereof. Plate 15 further comprises an aperture 48 that passes through the middle of plate 15. Aperture 48 can be circular, rectangular, parallelogram, or rhomboid-shaped. Plate 15 can be rectangular-shaped, circle-shaped, or square-shaped. Extending perpendicularly from plate 15, on the opposite side from the corrugations 32, are two pairs of S-shaped, symmetric prongs 38, 38' (right prongs 38R' and left prongs 38L, 38L', respectively). Note that prongs 38 and 38' are not centered vertically on washer 12; but, rather, are offset towards the lower ½ of washer 12. This places the upper prong 38 at approximately the vertical center of washer 12.

Figure 11:
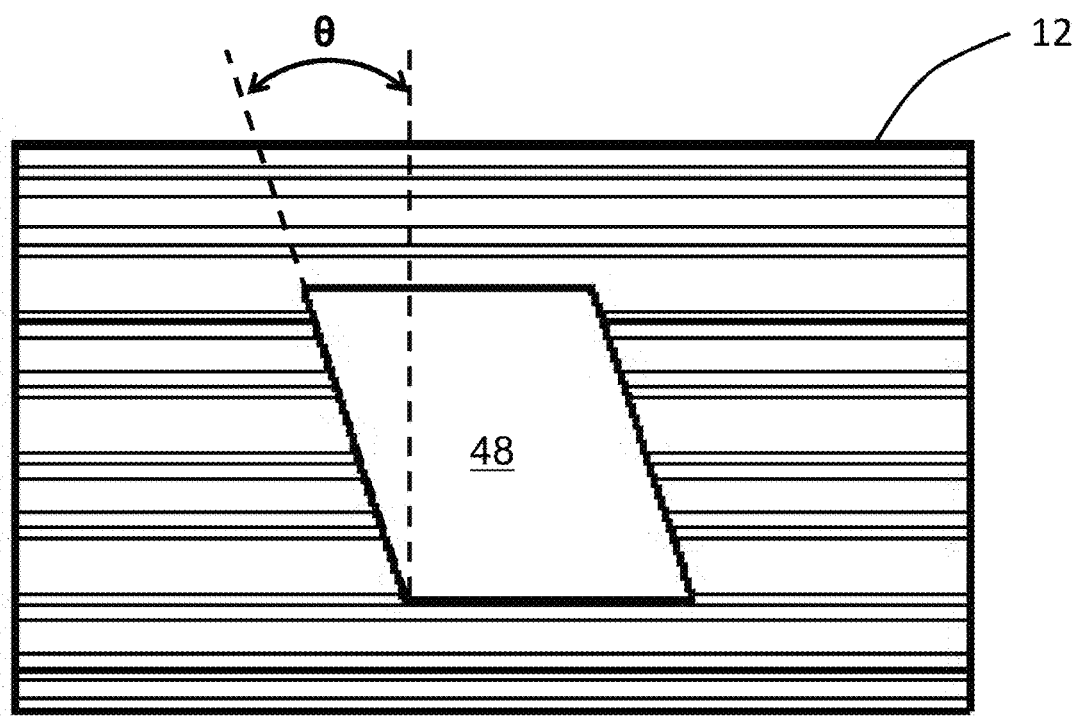
FIG. 11 shows a front elevation view of a first embodiment of a corrugated washer, according to the present invention.
Figure 12:
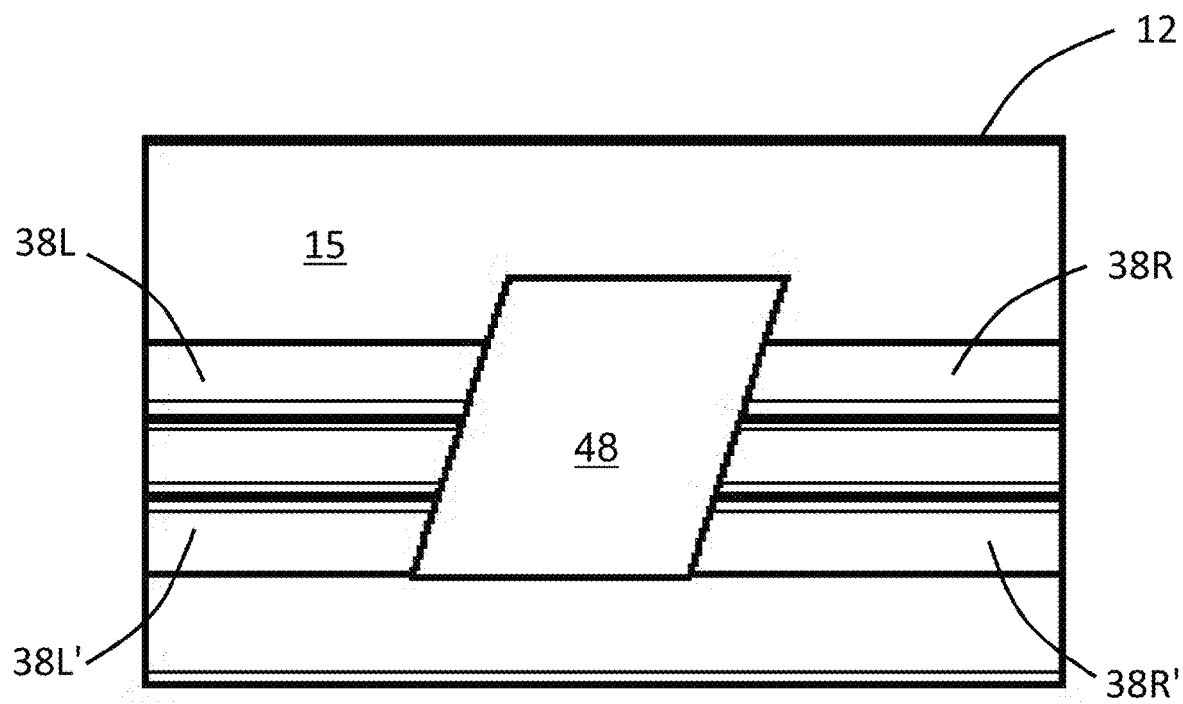
FIG. 12 shows a front elevation view of a first embodiment of a corrugated washer, according to the present invention.

FIG. 11 shows a front elevation view of a first embodiment of a corrugated washer 12, according to the present invention. Washer 12 comprises an aperture 48 that passes through the middle of washer 12. Aperture 48 can be circular, rectangular, parallelogram, or rhomboid-shaped (as is shown in FIGS. 11 and 12). The rhomboid shape is selected to closely match the rhomboid-shaped T-head 24 of T-bolt 14. The rhomboid angle, θ, of rhombus-shaped aperture 48 can range from 0 to 45 degrees; with a preferred angle being 20 degrees. Alternatively, the rhomboid angle can be selected so that it results in locking a T-bolt into slot 20 of rail 18 so that the T-bolt 14 cannot "back-rotate", and cannot fall out of the rail slot 20 after installation. Plate 15 can be rectangular-shaped, circle-shaped, oval-shaped, or square-shaped.

FIG. 12 shows a rear elevation view of a first embodiment of a corrugated washer 12, according to the present invention. Washer 12 comprises an aperture 48 that passes through the middle of washer 12. Aperture 48 can be circular, rectangular, parallelogram, or rhomboid-shaped (as is shown in FIG. 11). The rhomboid shape is selected to match the rhomboid-shaped T-head 24 of T-bolt 14. Plate 15 can be rectangular-shaped, circle-shaped, or square-shaped. The rhomboid angle, θ, of rhombus-shaped aperture 48 can range from 0 to 45 degrees; with a preferred angle being 20 degrees. Aperture 48 cuts through prongs 38L, 38L', 38R, and 38R', which leaves the cut-inside-edges of the prongs angled at the same rhomboid angle, θ.

Figure 13A:
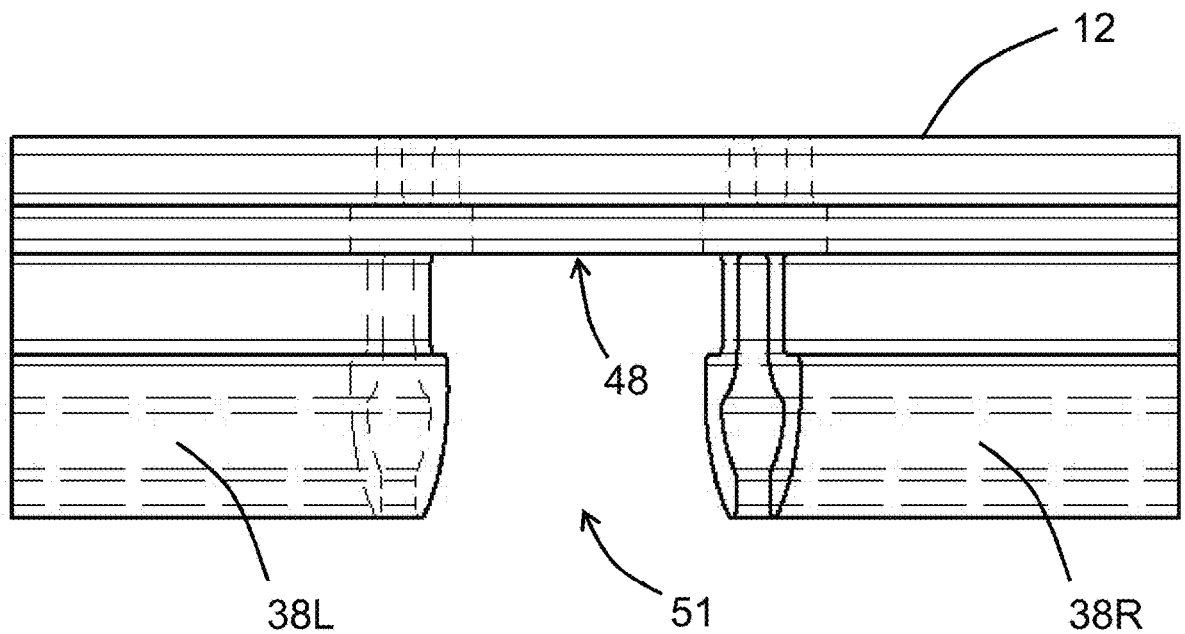
FIG. 13A shows a top plan view of a first embodiment of a corrugated washer, according to the present invention.
Figure 13B:
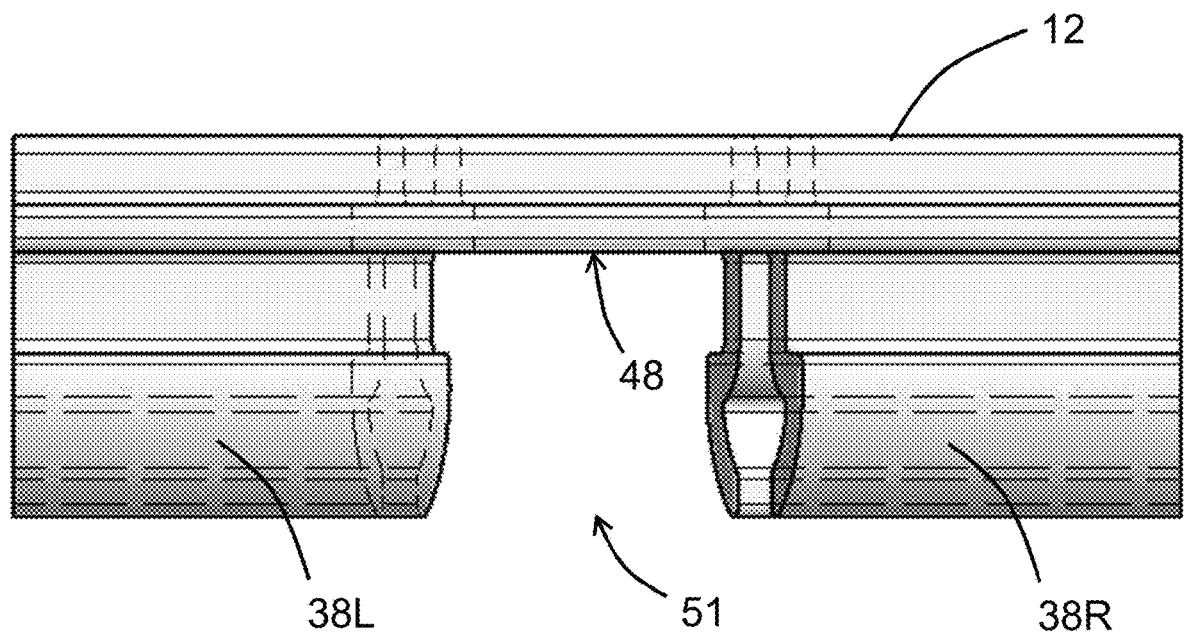
FIG. 13B shows a shaded, top plan view of a first embodiment of a corrugated washer, according to the present invention.

FIGS. 13A and 13B show a top plan view of a first embodiment of a corrugated washer 12, according to the present invention. Washer 12 comprises an aperture 48 that passes through the middle of washer 12. Aperture 48 can be circular, rectangular, or parallelogram, or rhomboid-shaped (as shown in FIG. 11). The rhomboid shape is selected to match the angled T-head 24 of T-bolt 14. Plate 15 can be rectangular-shaped, circle-shaped, or square-shaped. The rhomboid angle, θ, of rhombus-shaped aperture 48 can range from 0 to 30 degrees; with a preferred angle being 20 degrees. Aperture 48 cuts through prongs 38L, 38L', 38R, and 38R', thereby creating gap (opening) 51. Prongs 38R, 38L, 38R', and 38L' extend outwards to the outermost edges (width) of plate 14.

Figure 14A:
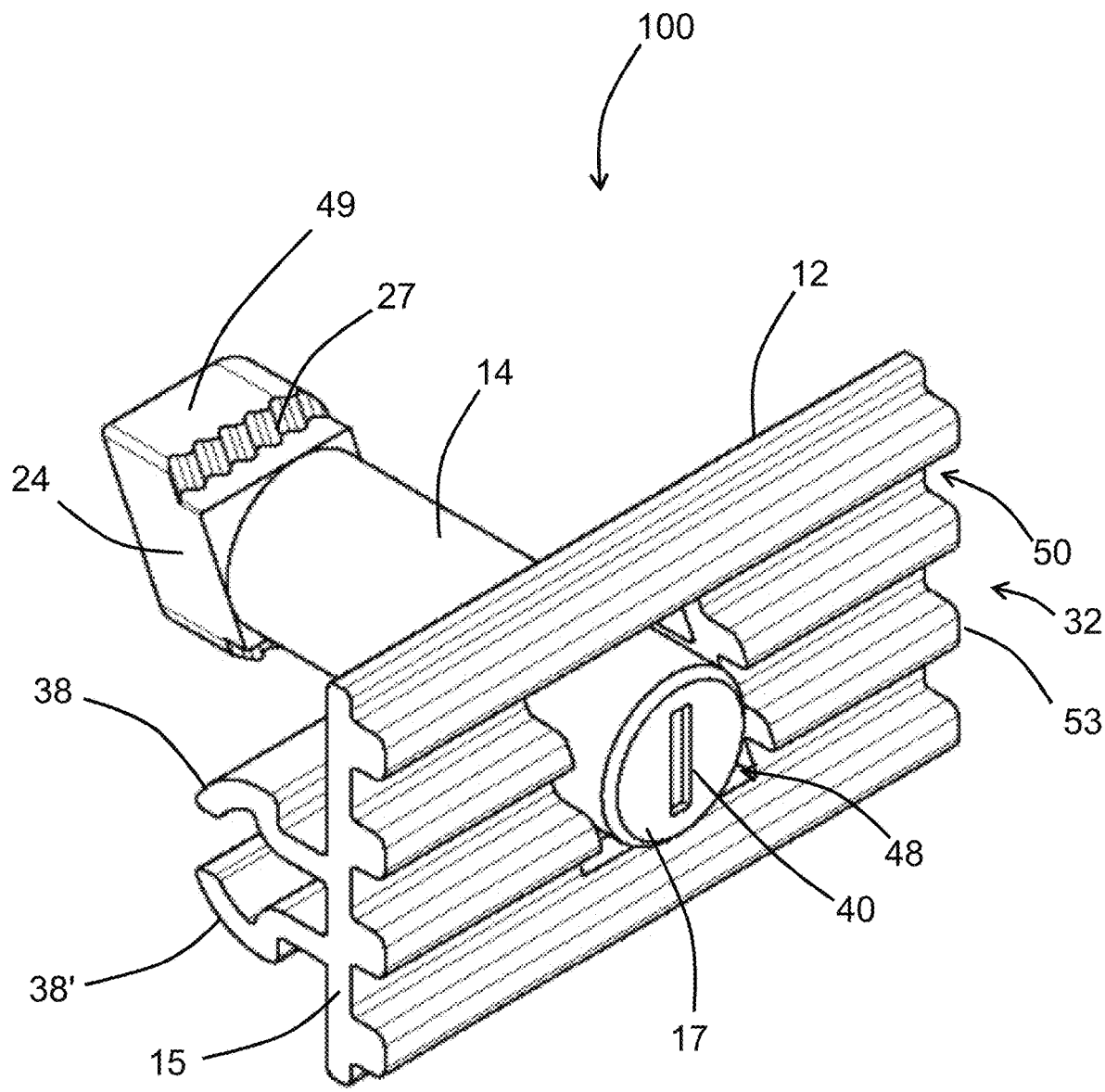
FIG. 14A shows an exploded front perspective view of a first embodiment of an assembly comprising a corrugated washer placed on a T-bolt, according to the present invention.

FIG. 14A shows an exploded front perspective view of a first embodiment of an assembly 100 comprising a corrugated washer 12 placed on a T-bolt 14, according to the present invention. The distal end 17 of T-bolt 14 is inserted through aperture 48 of washer 12. Alignment slot 40 on the distal end 17 of T-bolt 14 can be seen. Note that T-head 24 comprises shoulder 49 and sharp serrations 27 on the underside of shoulder 49, which are used to create a good electrical bond when contacting anodized aluminum. The longitudinal axis of T-bolt 14 is oriented perpendicular to the plane of plate 15; and slot 40 is aligned vertically (i.e., perpendicular to horizontal corrugations 32) when T-bolt 14 is placed in its final locked position and rotational orientation. Washer 12 accomplishes locking the T-bolt in place and preventing back rotation and falling off of the T-bolt.

Figure 14B:
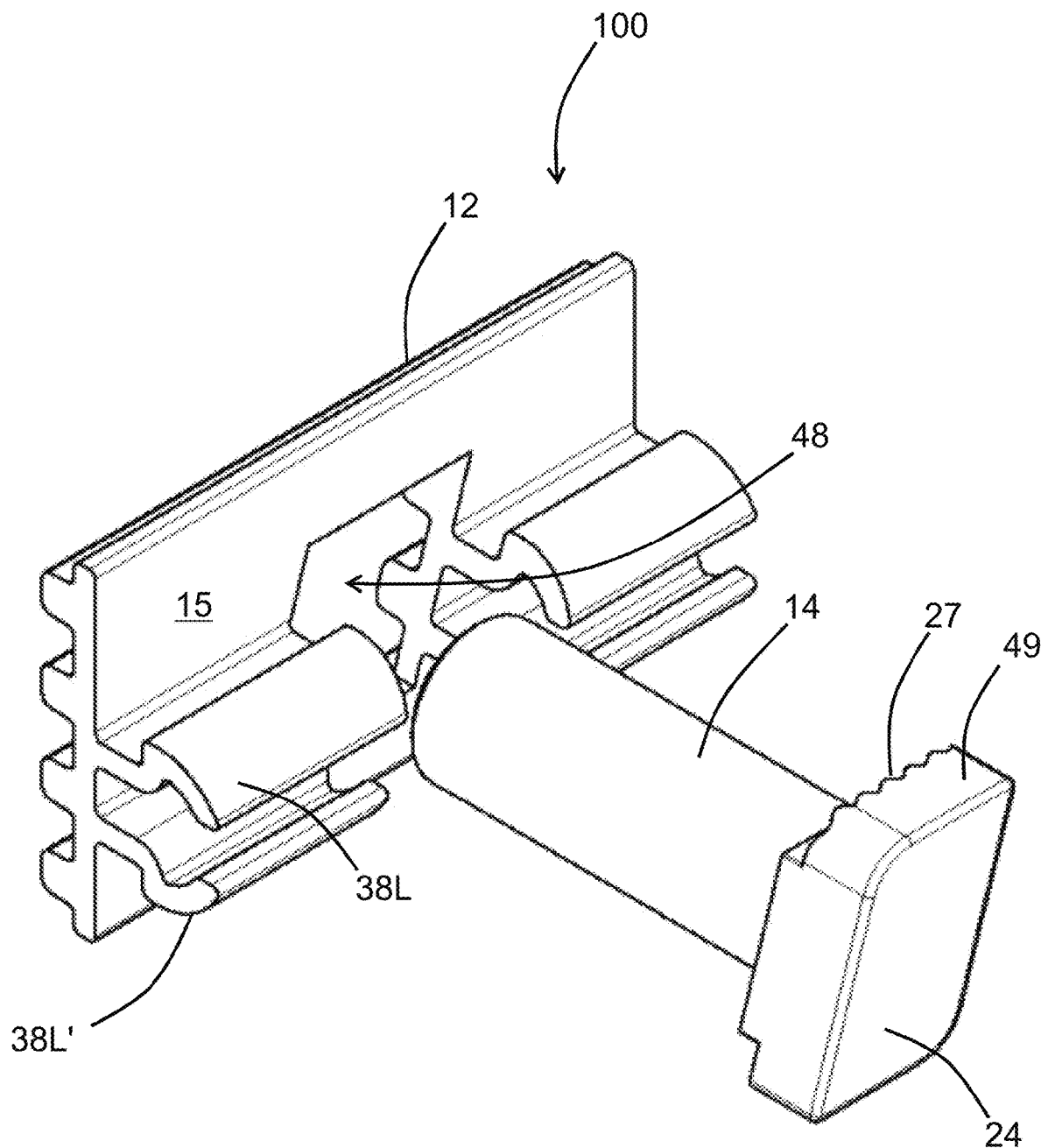
FIG. 14B shows an exploded rear perspective view of a first embodiment of an assembly comprising a corrugated washer and a T-bolt, according to the present invention.

FIG. 14B shows an exploded rear perspective view of a first embodiment of an assembly 100 comprising a corrugated washer 12 placed on a T-bolt 14, according to the present invention. The distal end 17 (FIG. 14A) of T-bolt 14 is inserted through aperture 48 of washer 12. Alignment slot 40 (FIG. 14A) on the distal end 17 of T-bolt 14 can be seen. Note that T-head 24 comprises shoulder 49 and sharp serrations 27 on the underside of shoulder 49, which are used to create a good electrical bond when contacting anodized aluminum. The longitudinal axis of T-bolt 14 is oriented perpendicular to the plane of plate 15.

Figure 15A:
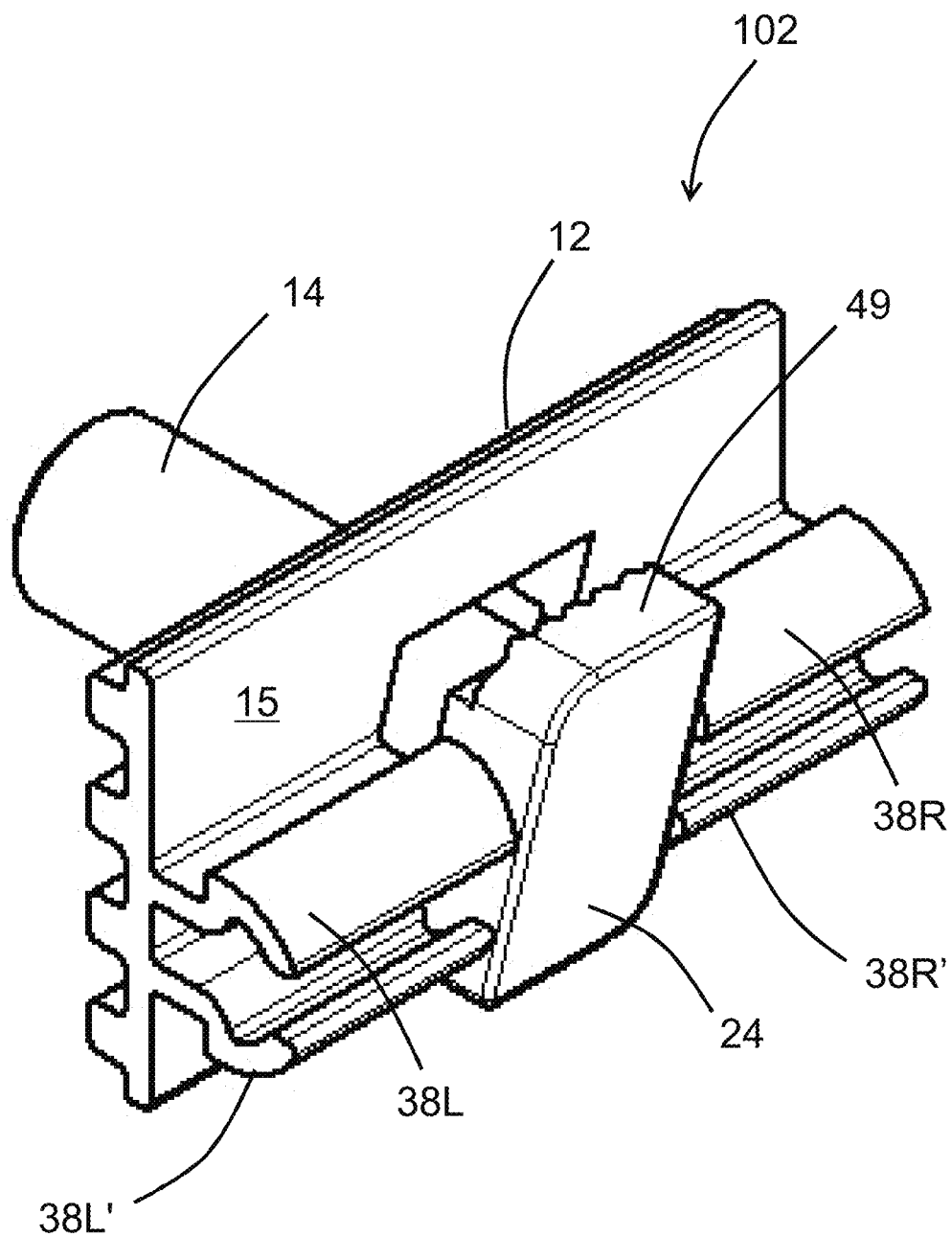
FIG. 15A shows a front perspective view of a first embodiment of an assembly comprising a corrugated washer and a T-bolt, according to the present invention.

FIG. 15A shows a front perspective view of a first embodiment of an assembly 102 comprising a corrugated washer 12 and a T-bolt 14, according to the present invention. In this assembly, prongs 38L and 38R (and 38L' and 39R') combine to restrict any back-rotation of T-bolt 14. When installed into rail slot 20 (See FIGS. 28 and 30), washer 12 prevents back-rotation (and disengagement) of T-bolt 14, for example, when nut 16 is loosened to adjust the height of the rail 18 on the L-foot bracket 10.

Figure 15B:
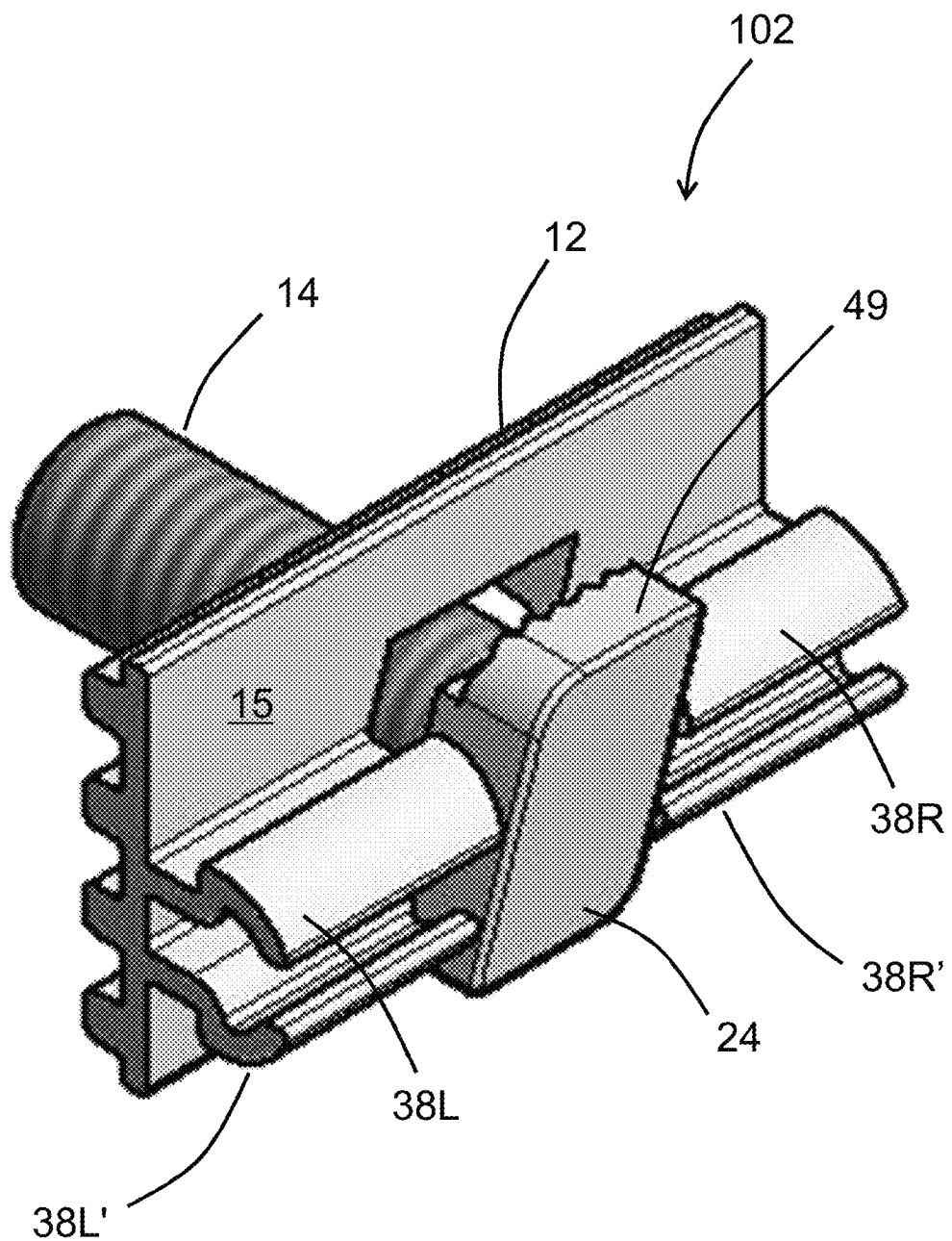
FIG. 15B shows a shaded front perspective view of a first embodiment of an assembly comprising a corrugated washer and a T-bolt, according to the present invention.

FIG. 15B shows a shaded front perspective view of a first embodiment of an assembly 102 comprising a corrugated washer 12 and a T-bolt 14, according to the present invention. In this assembly, prongs 38L and 38R (and 38L' and 39R') combine to restrict any back-rotation of T-bolt 14. When installed into rail slot 20 (See FIGS. 28 and 30), washer 12 prevents back-rotation (and disengagement) of T-bolt 14, for example, when nut 16 is loosened to adjust the height of the rail 18 on the L-foot bracket 10.

Figure 16:
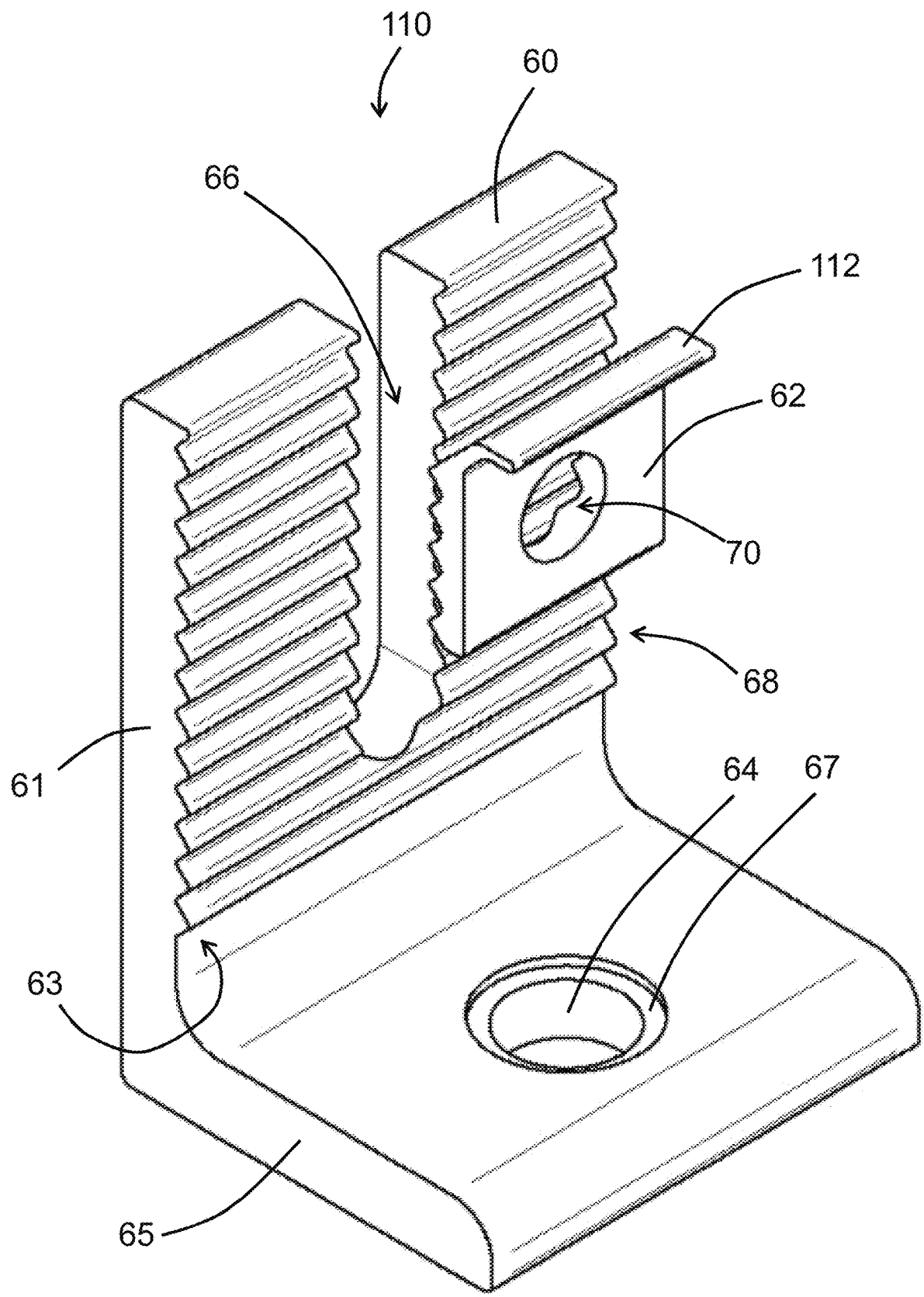
FIG. 16 shows a rear perspective view of a second embodiment of an assembly comprising a corrugated washer and a corrugated L-foot bracket, according to the present invention.

FIG. 16 shows a rear perspective view of a second embodiment of an assembly 110 comprising a corrugated washer 62 and a corrugated L-foot bracket 60, according to the present invention. L-foot 60 has a U-shaped vertical channel 66 for accepting a T-bolt (not shown). L-foot bracket 60 comprises a plurality of horizontal, uniformly-spaced, parallel corrugations 68 that span the width of L-foot 60. Corrugations 68 are disposed on the interior (inside) rear-facing surface 63 of the upper vertical leg 61 of L-foot 60. In this example, corrugations 68 are sinusoidal-shaped (wavy). Washer 62 has an aperture 70; matching interlocking corrugations 71 (FIG. 17); and a horizontal upper flange 112 for aiding in holding onto washer 62 when being placed into its operational position. Washer 62 has five corrugations 71, but any number from 1-12, for example, can be used. L-foot 60 has thirteen full-corrugations, but any number from 1-20, for example, can be used. Aperture 64 in base 65 is surrounded by a concentric, upper annular (counterbore) 67 located on the upper side of base 65; and surrounded by a concentric, lower annular recess (counterbore) 69 located on the lower side of base 65. Aperture 64 and circular recesses 67 and 69, respectively, cooperate to securely hold an I-shaped elastomeric (e.g., rubber or EDPM) grommet 200 (see FIG. 23) that is used for providing water sealing of the lag screw (not shown). The width of washer 62 can be as wide as L-foot 60, or it can be less than the width of L-foot 60 (as shown). Alternatively, finger flange 112 could be located on the bottom of washer 62; or be on both the top and bottom of washer 62.

Figure 17:
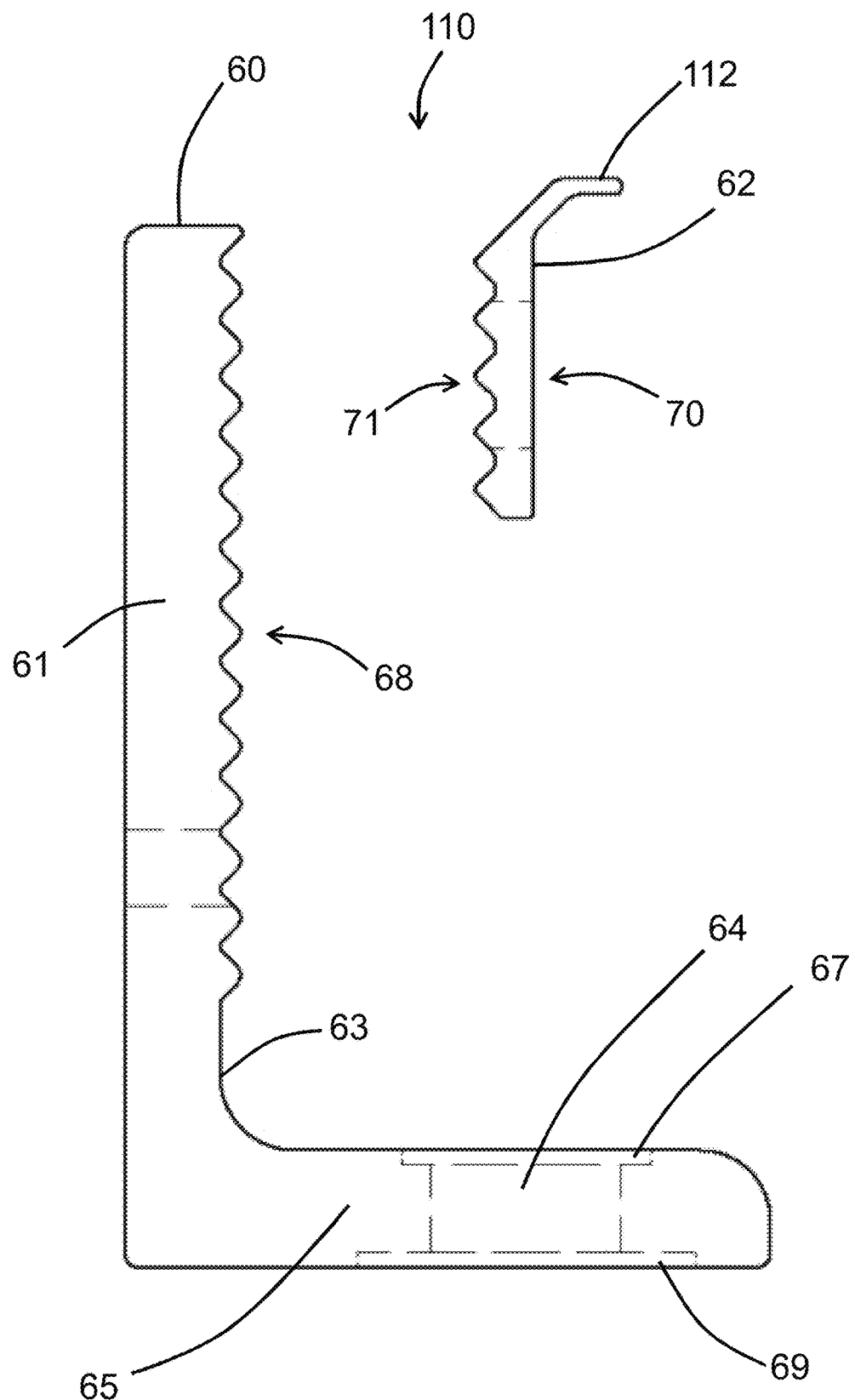
FIG. 17 shows a side elevation view of a second embodiment of an assembly comprising a corrugated washer and a corrugated L-foot bracket, according to the present invention.

FIG. 17 shows a side elevation view of a second embodiment of an assembly 110 comprising a corrugated washer 62 and a corrugated L-foot bracket 60, according to the present invention. L-foot bracket 60 comprises a plurality of horizontal, uniformly spaced corrugations 68 that span the width of L-foot 60. Corrugations 68 are disposed on the interior (inside) rear-facing surface 63 of the upper vertical leg 61 of L-foot 60. In this example, corrugations 68 are sinusoidal-shaped (wavy). Washer 62 has a central aperture 70; matching interlocking corrugations 71; and a horizontal upper flange 112 for aiding in holding onto washer 62 when being placed in its operational position. Washer 62 has five corrugations 71, but any number from 2-12, for example, can be used. L-foot 60 has thirteen full corrugations, but any number from 2-30, for example, can be used. Aperture 64 in base 65 is surrounded by a concentric, upper annular recess (counterbore) 67 located on the upper side of base 65; and by a concentric, lower annular recess 69 located on the lower side of base 65. Aperture 64 and upper/lower counterbores 67 and 69, respectively, cooperate to securely hold an I-shaped elastomeric (e.g., rubber or EDPM) grommet (see FIG. 23) that is used for providing water sealing of the lag screw (not shown). The width of washer 62 can be as wide as L-foot 60, or it can be less than the width of L-foot 60 (as shown).

Figure 18:
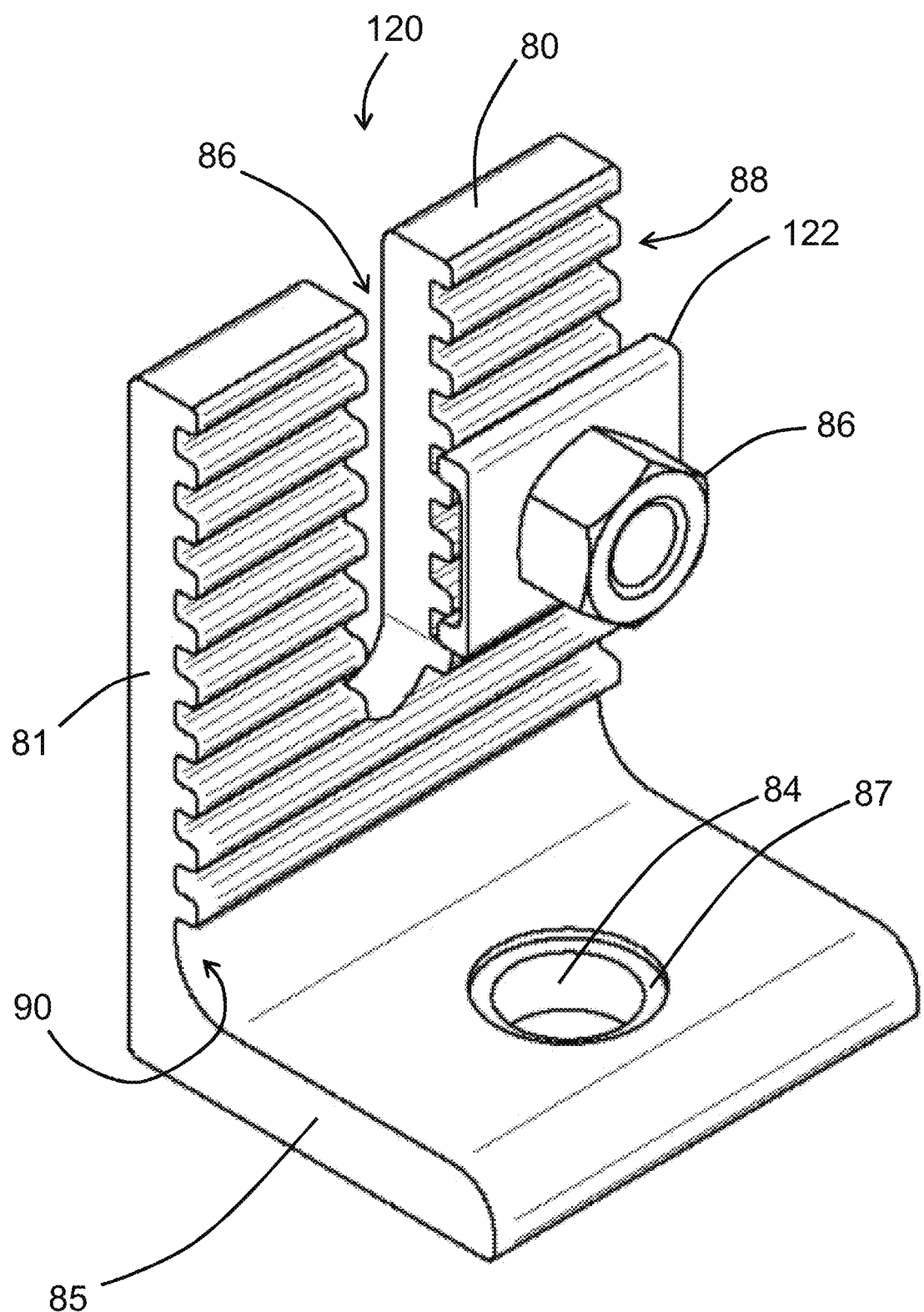
FIG. 18 shows a front perspective view of a third embodiment of an assembly comprising a corrugated washer and a corrugated L-foot bracket, according to the present invention.
Figure 19:
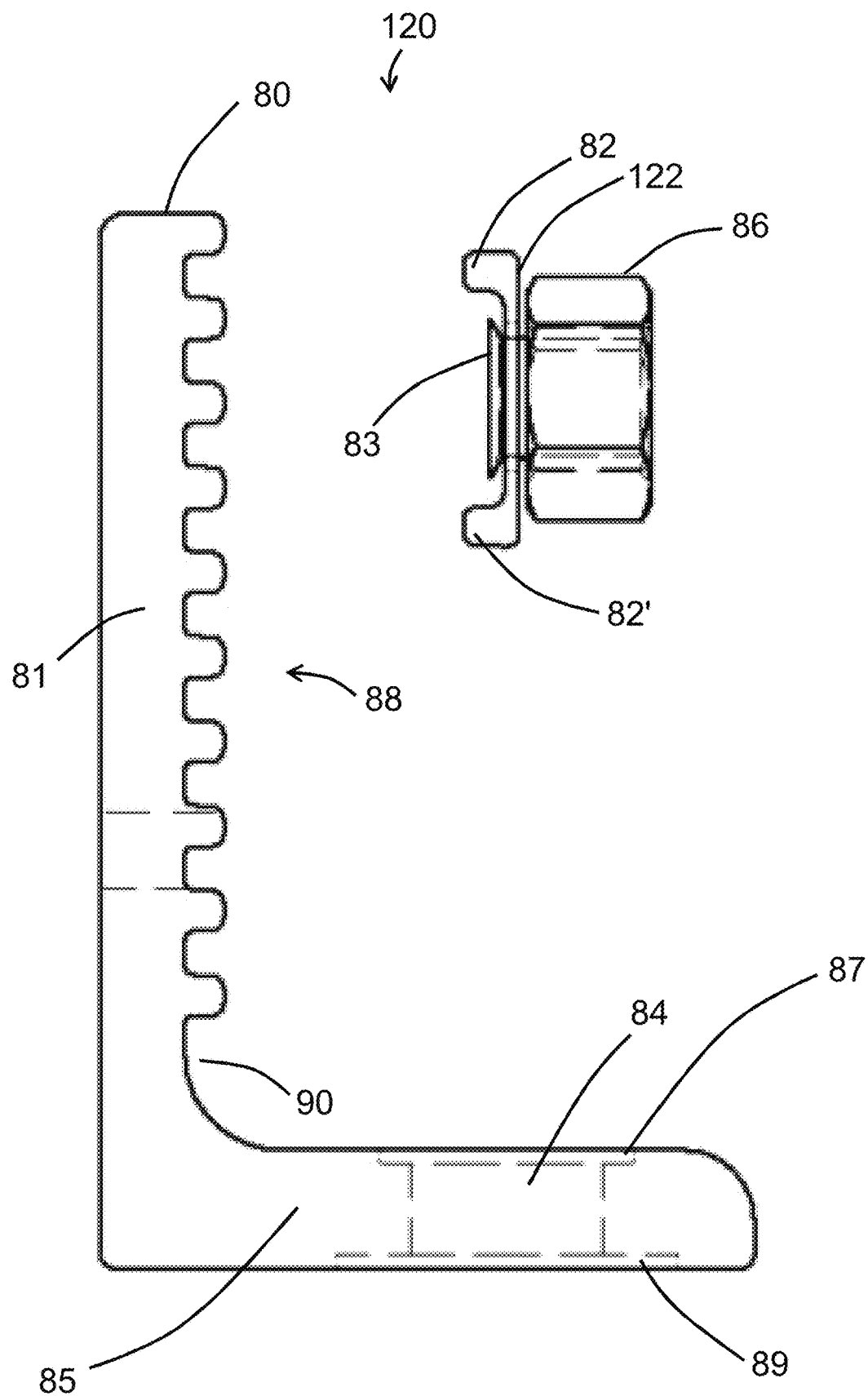
FIG. 19 shows a side elevation view of a third embodiment of an assembly comprising a corrugated washer and a corrugated L-foot bracket, according to the present invention.

FIG. 18 shows a rear perspective view of a third embodiment of an assembly 120 comprising a corrugated washer 122 and a corrugated L-foot bracket 80, according to the present invention. L-foot bracket 80 comprises a plurality of horizontal, uniformly-spaced, parallel corrugations 88 that span the width of L-foot 80. L-foot 80 has a U-shaped vertical channel 86 for accepting a T-bolt (not shown). Corrugations 88 are disposed on the interior (inside) rear-facing surface 90 of the upper vertical leg 81 of L-foot 80. In this example, corrugations 88 are square-shaped. Washer 122 has a central aperture for accepting a T-bolt (not shown); and a mating pair of interlocking corrugations 82 and 82' (FIG. 19). Nut 86 (called a "Keps" nut) has an attached circular swaged flange 83 that is rotationally coupled to washer 122. In other words, nut 86 has a free-spinning washer 122 attached to it. L-foot 80 has ten full-corrugations, but any number from 1-20, for example, can be used. Aperture 84 in base 85 is surrounded by a concentric, upper annular recess (counterbore) 87 located on the upper side of base 85, and by a concentric, lower annular recess (counterbore) 89 located on the lower side of base 85. Aperture 84 and upper/lower counterbores 87 and 89, respectively, cooperate to securely hold an I-shaped elastomeric (e.g., rubber or EDPM) grommet (see FIG. 23) that is used for providing water sealing of the lag screw (not shown). The width of washer 122 can be as wide as L-foot 80, or it can be less wide than L-foot 80.

FIG. 19 shows a side elevation view of a third embodiment of an assembly 120 comprising a corrugated washer 122 and a corrugated L-foot bracket 80, according to the present invention. L-foot bracket 80 comprises a plurality of horizontal, uniformly-spaced, parallel corrugations 88 that span the width of L-foot 80. L-foot 80 has a U-shaped vertical channel 86 (FIG. 18) for accepting a T-bolt (not shown). Corrugations 88 are disposed on the interior (inside) rear-facing surface 90 of the upper vertical leg 81 of L-foot 80. In this example, corrugations 88 are square-shaped. Washer 122 has a central aperture for accepting a T-bolt (not shown); and a mating pair of interlocking corrugations 82 and 82'. Nut 86 (called a "Keps" nut) has an attached circular swaged flange 83 that is rotationally coupled to washer 122. In other words, Keps nut 86 has a free-spinning washer 122 attached to it. L-foot 80 has ten full-corrugations, but any number from 2-50, for example, can be used. Aperture 84 in base 85 is surrounded by a concentric, upper annular recess (counterbore) 87 located on the upper side of base 85, and by a concentric, lower annular recess (counterbore) 89 located on the lower side of base 85. Aperture 84 and upper/lower counterbores 87 and 89, respectively, cooperate to securely hold an I-shaped elastomeric (e.g., rubber or EDPM) grommet (see FIG. 23) that is used for providing water sealing of the lag screw (not shown). The width of washer 122 can be as wide as L-foot 80, or it can be less wide than L-foot 80.

Figure 20:
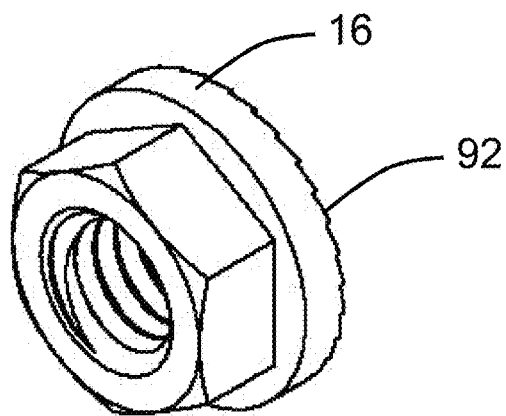
FIG. 20 shows a front perspective view of a nut with serrations.

FIG. 20 shows a front perspective view of a nut 16 with a plurality of sharp radial serrations 92 surrounding a circumference of one side of nut 16. The sharp serrations 92 provide for good electrical contact and bonding when secured to an anodized aluminum component.

Figure 21:
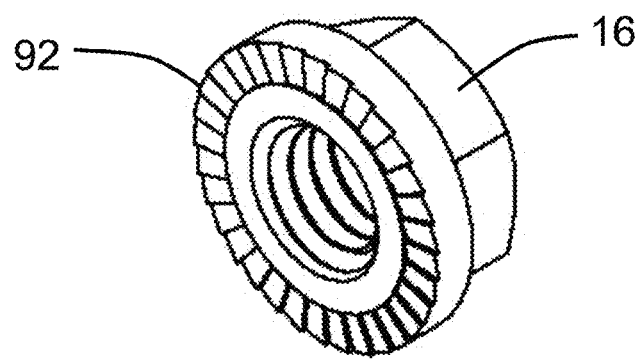
FIG. 21 shows a rear perspective view of a nut with serrations.

FIG. 21 shows a rear perspective view of a nut 16 with a plurality of sharp radial serrations 92 surrounding a circumference of one side of nut 16. The sharp serrations 92 provide for good electrical contact and bonding when secured to an anodized aluminum component.

Figure 22:
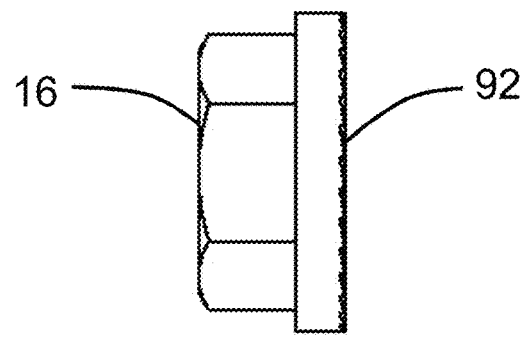
FIG. 22 shows a side elevation view of a nut with serrations.

FIG. 22 shows a side elevation view of a nut 16 with a plurality of sharp radial serrations 92 surrounding a circumference of one side of nut 16. The sharp serrations 92 provide for good electrical contact and bonding when secured to an anodized aluminum component.

Figure 23:
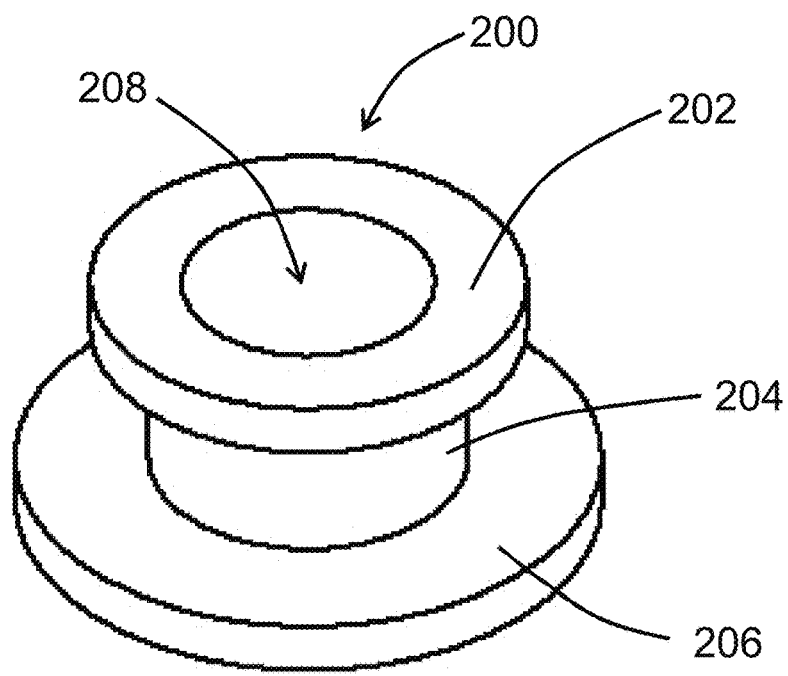
FIG. 23 shows a perspective view of an I-shaped grommet.

FIG. 23 shows a perspective view of an I-shaped grommet 200. Grommet 200 is made of an elastomeric material, such as rubber or EDPM. Grommet 200 is I-shaped, having a cylindrical body 204 and an integral upper flange 202 and an integral lower flange 206. The outer diameter of lower flange 206 can be the same, or greater, than the outer diameter of upper flange 202. Central aperture 208 receives a lag screw (not shown).

Figure 24:
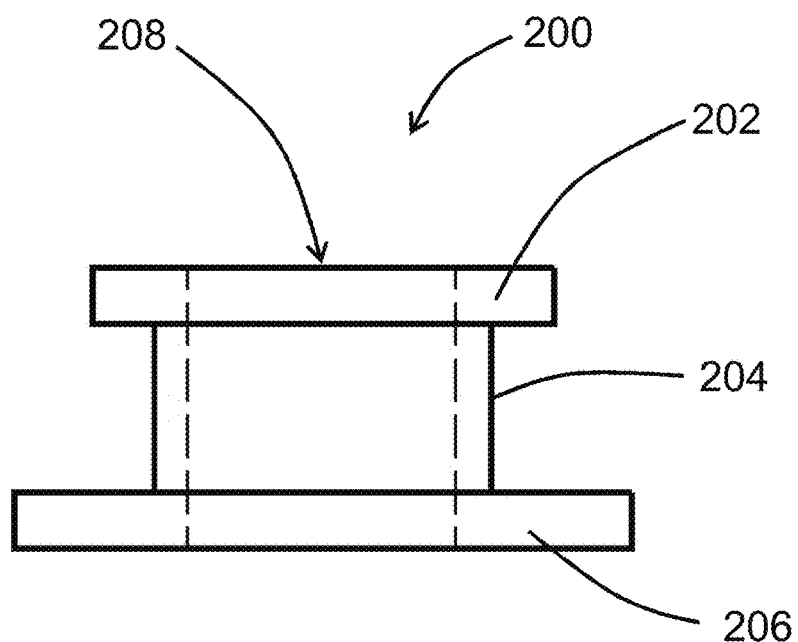
FIG. 24 shows a side elevation view of an I-shaped grommet.

FIG. 24 shows a side elevation view of an I-shaped grommet 200. Grommet 200 is made of an elastomeric material, such as rubber or EDPM. Grommet 200 is I-shaped, having a cylindrical body 204 and an integral upper flange 202 and an integral lower flange 206. The outer diameter of lower flange 206 can be the same or greater than the outer diameter of upper flange 202. Central aperture 208 receives a lag screw (not shown).

Figure 25A:
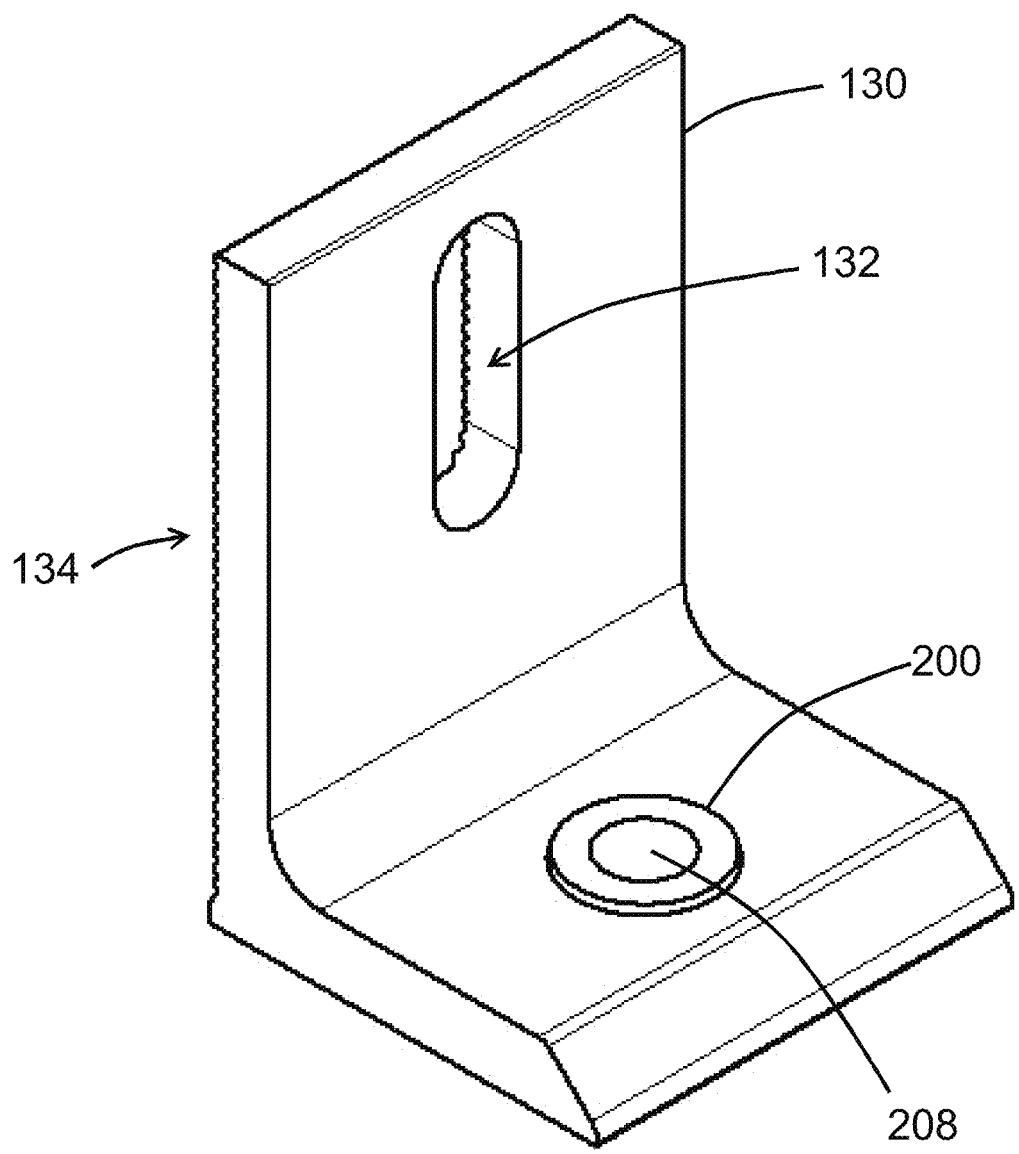
FIG. 25A shows a perspective view of an I-shaped grommet inserted into a L-foot bracket, according to the present invention.

FIG. 25A shows a perspective view of an I-shaped grommet 200 inserted into a L-foot bracket 130, according to the present invention.

Figure 25B:
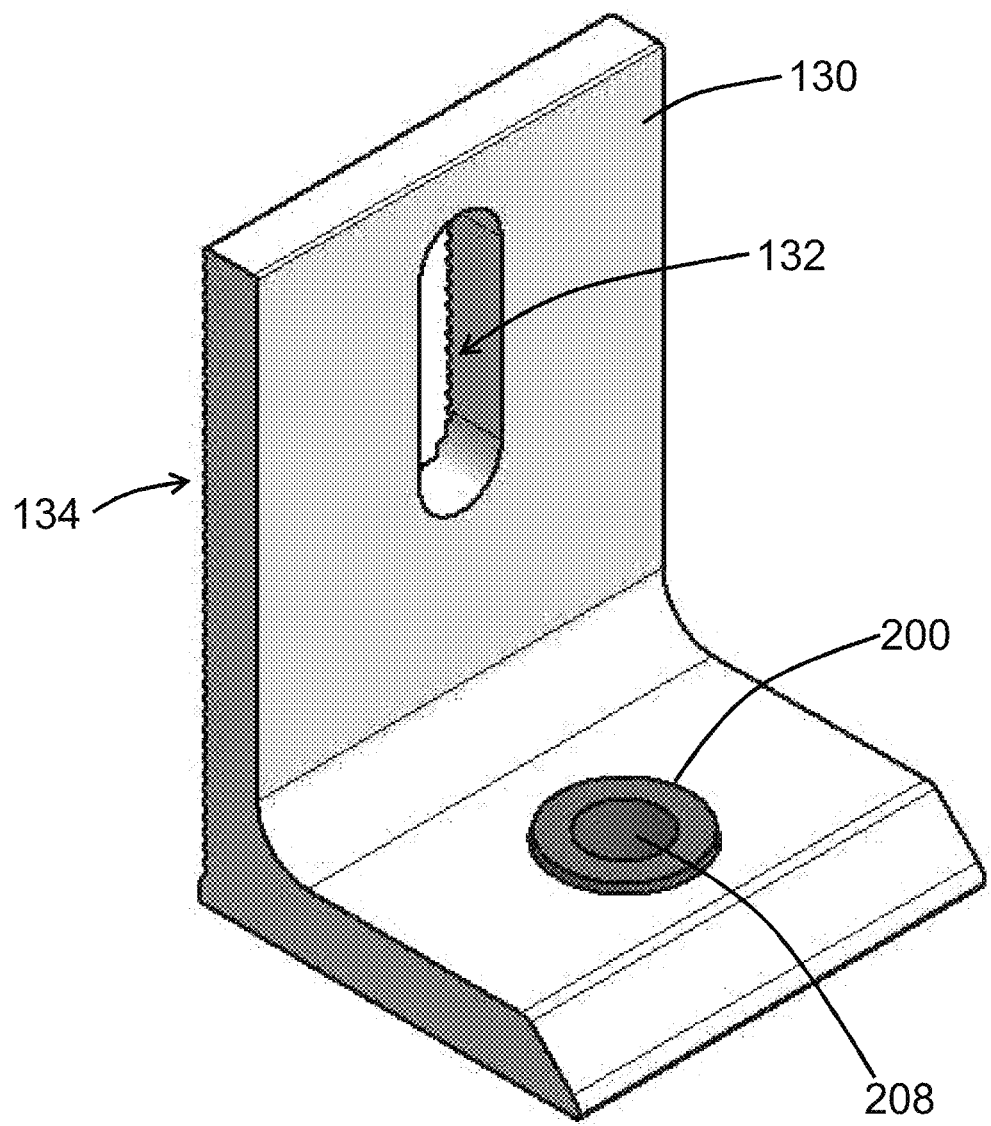
FIG. 25B shows a shaded perspective view of an I-shaped grommet inserted into a L-foot bracket, according to the present invention.

Each of FIGS. 25A and 25B shows a perspective view of an I-shaped grommet 200 inserted into a L-foot bracket 130, according to the present invention, with FIG. 25B being a shaded perspective view for clarity. L-foot bracket 130 comprises a vertical adjustment slot 132, and a plurality of uniformly-spaced, horizontal, parallel corrugations 134 (which can number forty-five corrugations, for example), which can be square-shaped corrugations. The central aperture 208 is also indicated.

Figure 26:
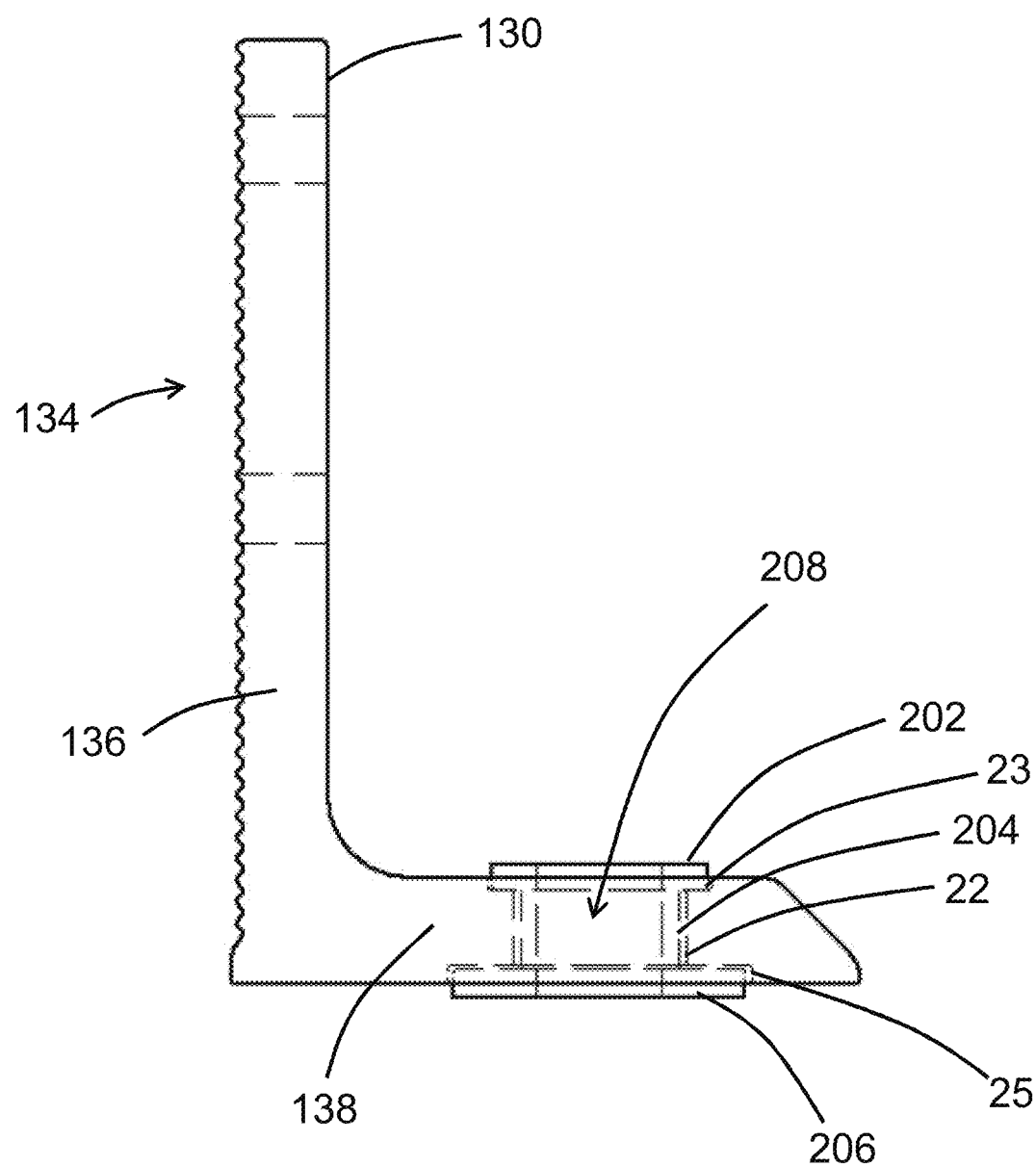
FIG. 26 shows a side elevation view of an I-shaped grommet inserted into a L-foot bracket, according to the present invention.

FIG. 26 shows a side elevation view of an I-shaped grommet 200 (FIG. 23) inserted into a L-foot bracket 130, according to the present invention. Upper flange 202 of grommet 200 fits snugly into upper circular recess 23 of base 138 of L-foot 130, and lower flange 206 of grommet 200 fits snugly into lower circular recess 25 of base 138. Cylindrical body 204 of grommet 200 fits snugly into cylindrical aperture 22 of base 138. Corrugations 134 on leg 136 and central aperture 208 are also indicated.

Figure 27:
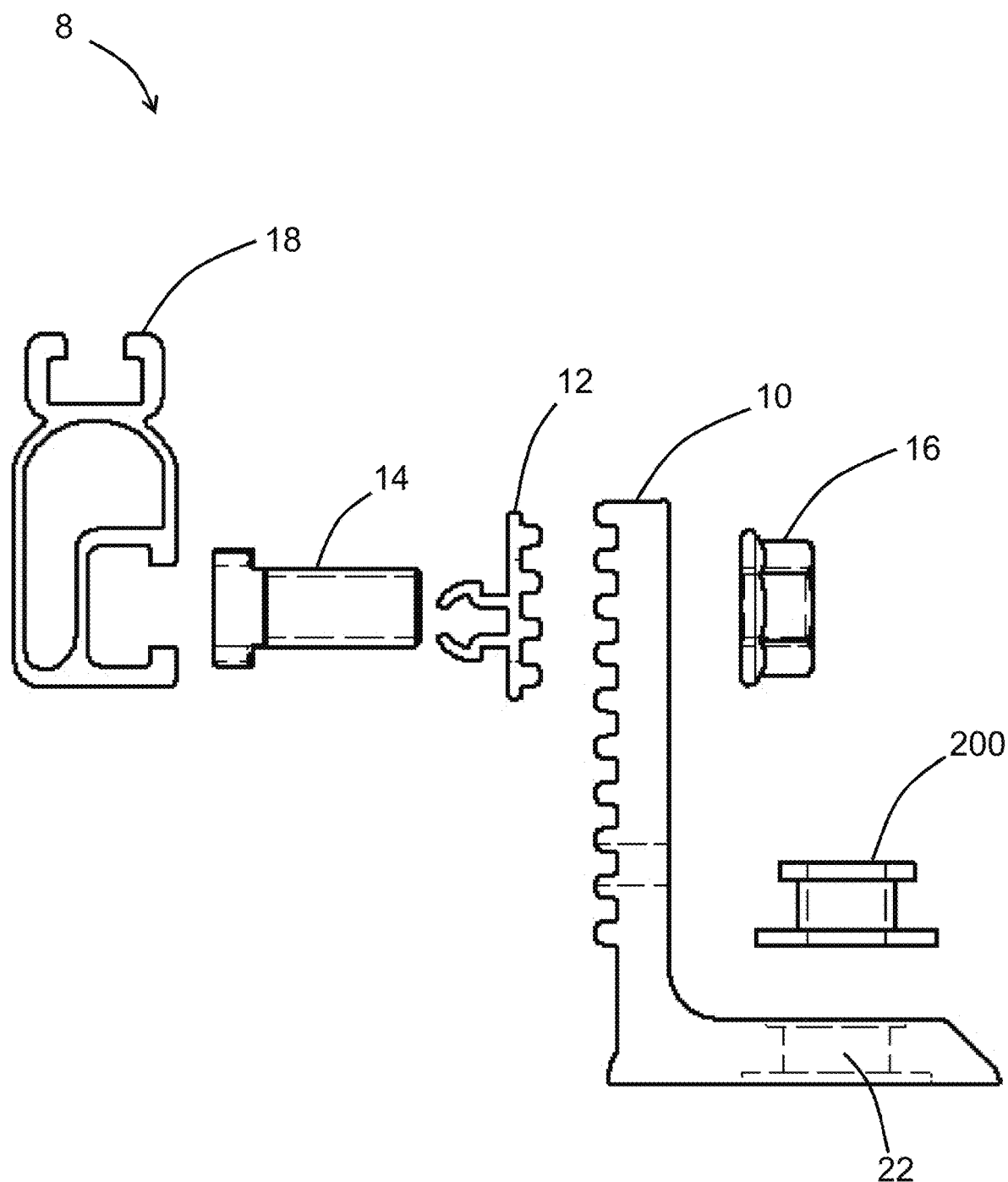
FIG. 27 shows a side elevation view of a first embodiment of a mounting assembly comprising, among other things, an I-shaped grommet inserted into a L-foot bracket, according to the present invention.

FIG. 27 shows a side elevation view of a first embodiment of a mounting assembly 8 comprising, among other things, an I-shaped grommet 200 inserted into a L-foot bracket 10, according to the present invention. Assembly 8 includes mounting rail 18, T-bolt 14, corrugated washer 12, L-foot bracket 10, and nut 16. Aperture 22 in the base of the L-foot bracket is also indicated.

Figure 28:
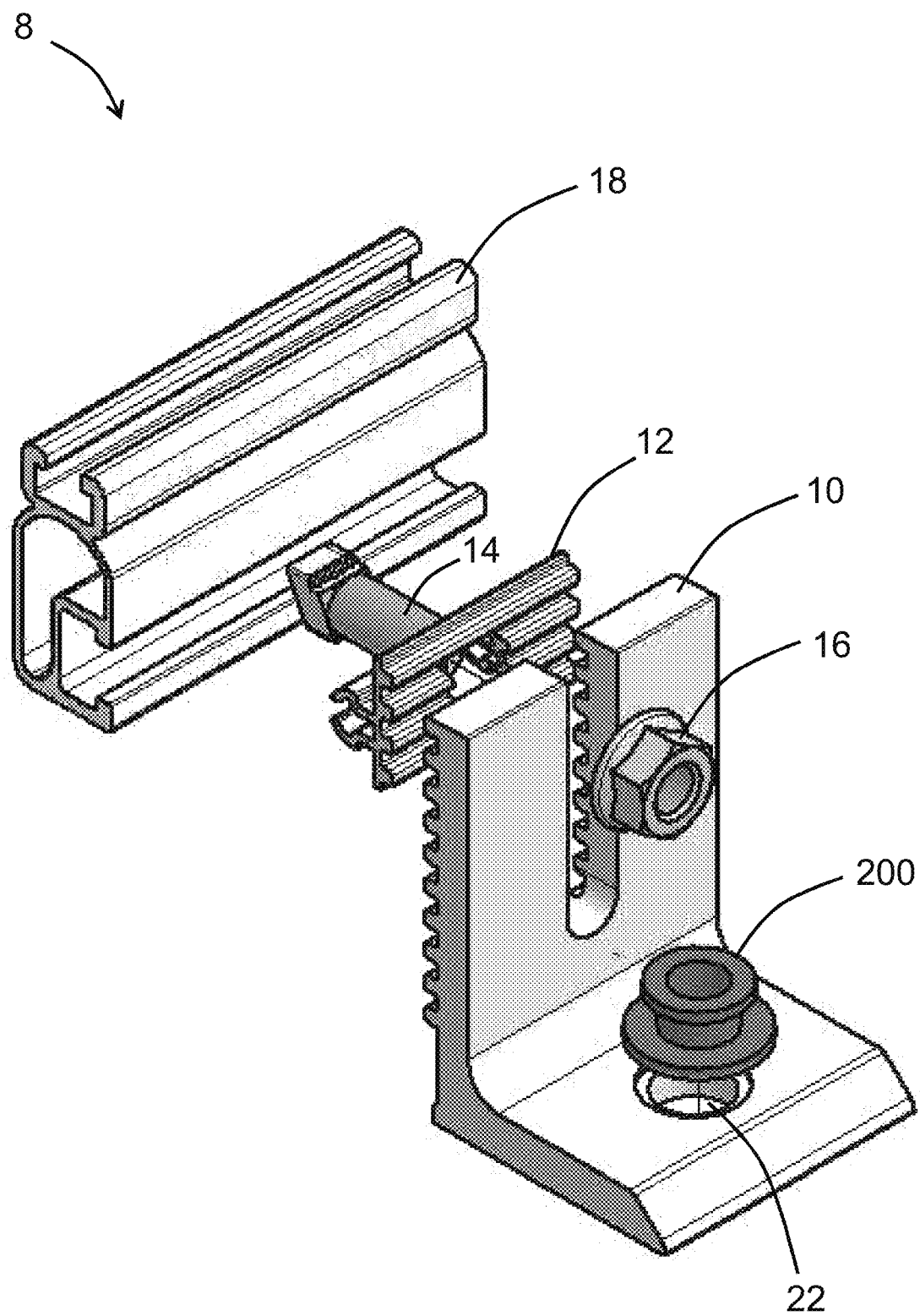
FIG. 28 shows a shaded exploded perspective view of a first embodiment of a mounting assembly comprising, among other things, an I-shaped grommet inserted into a L-foot bracket, according to the present invention.

FIG. 28 shows a shaded exploded perspective view of a first embodiment of a mounting assembly comprising, among other things, an I-shaped grommet 200 inserted into an aperture 22 in L-foot bracket 10, according to the present invention. Assembly 8 includes mounting rail 18, T-bolt 14, corrugated washer 12, L-foot bracket 10, and nut 16.

Figure 29:
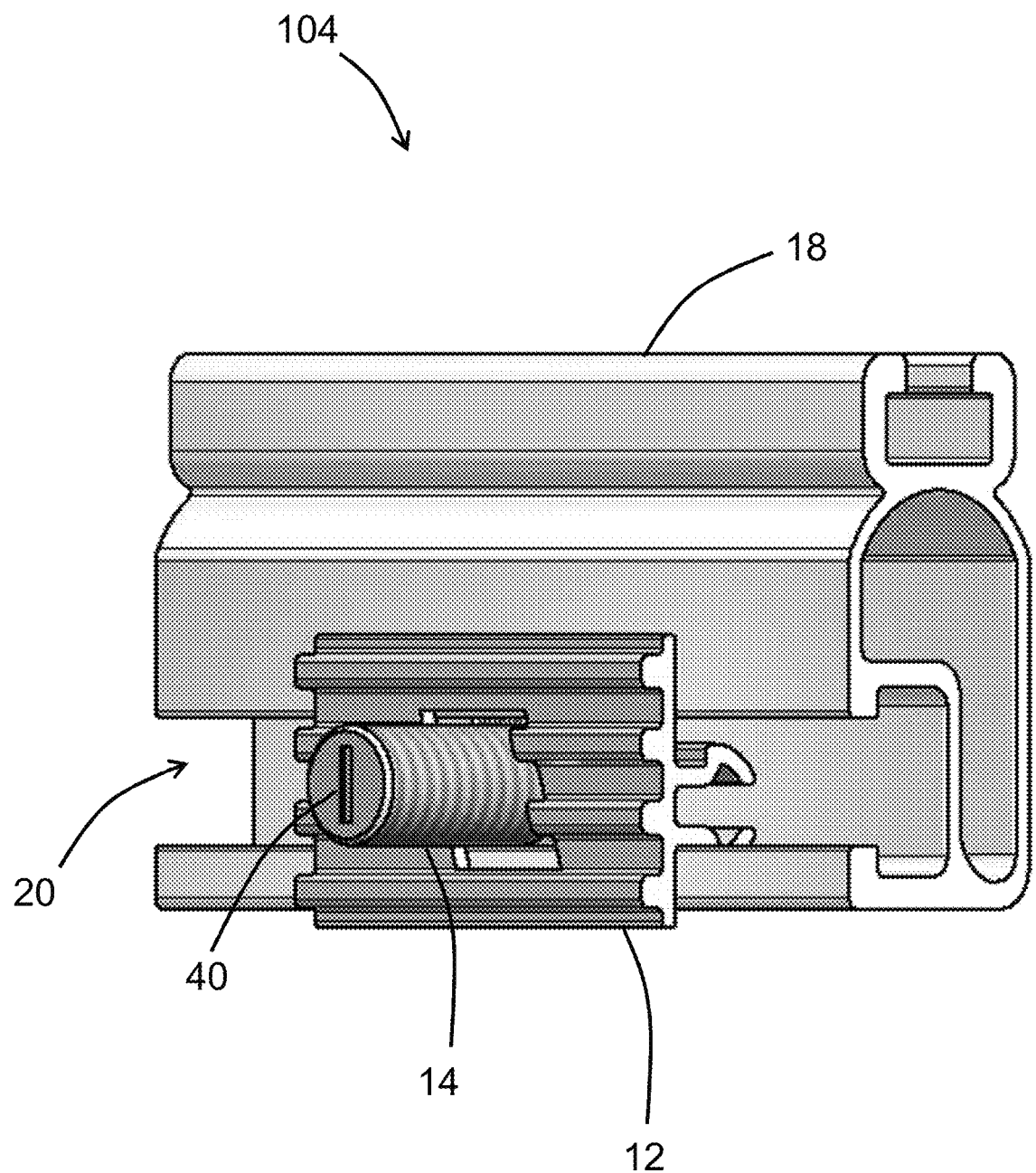
FIG. 29 shows a shaded front perspective view of a first embodiment of an assembly comprising a corrugated washer and a T-bolt installed in a slot of a rail, according to the present invention.

FIG. 29 shows a shaded front perspective view of a first embodiment of an assembly 104 comprising corrugated washer 12 and T-bolt 14 inserted in slot 20 of rail 18, according to the present invention. Vertical orientation slot/marker 40 can be seen oriented in the vertical position.

Figure 30:
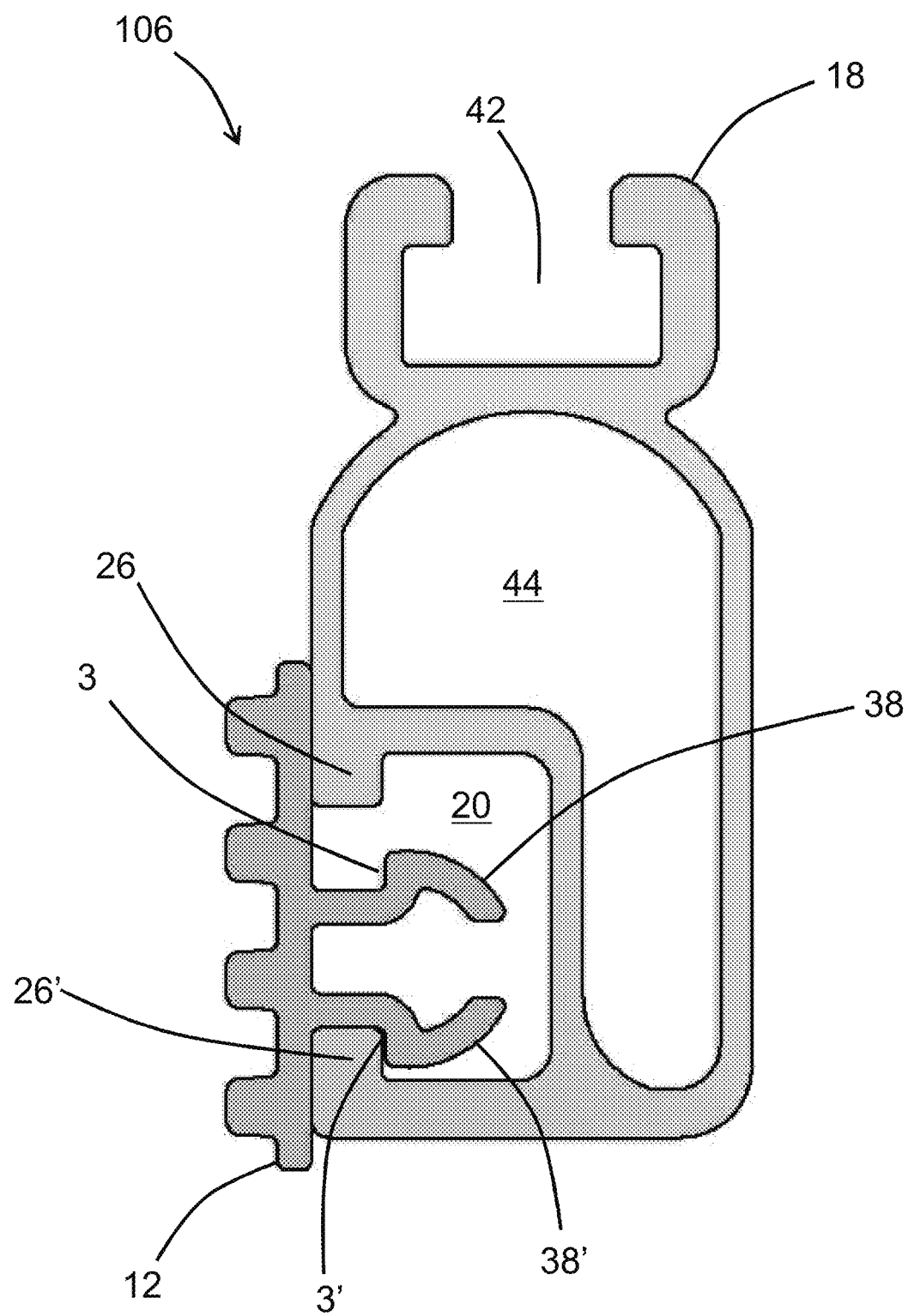
FIG. 30 shows a shaded end view of a first embodiment of an assembly comprising a corrugated washer installed in a rail, according to the present invention.

FIG. 30 shows a shaded end view of a first embodiment of an assembly 106 comprising corrugated washer 12 installed in slot 20 of rail 18, according to the present invention. Washer 12 rests by gravity on the bottom of slot 20, with the lower shoulder 3' resting on lower lip 26' of rail 18. In this sense, the lower prong 38' is engaged with rail 18, while the upper prong 38 is not engaged with rail 18. Upper shoulder 3, upper lip 26, horizontal upper channel 42, and interior void space 44 are also indicated.

Figure 31:
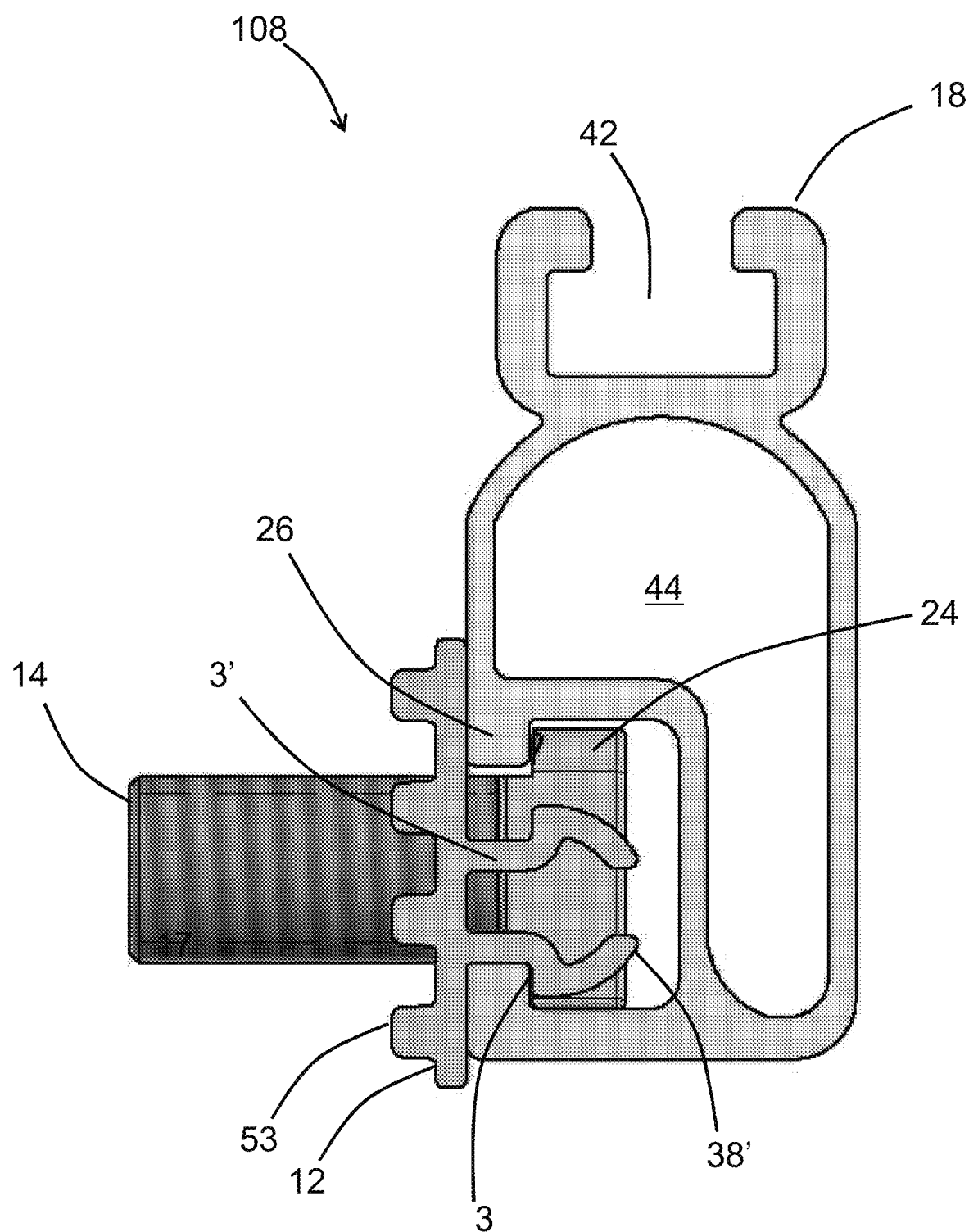
FIG. 31 shows a shaded end view of a first embodiment of an assembly comprising a corrugated washer, a T-bolt installed in a rail according to the present invention.

FIG. 31 shows a shaded end view of a first embodiment of an assembly 108 comprising a corrugated washer 12 and T-bolt 14 installed on rail 18 according to the present invention. Washer 12 rests by gravity on the bottom of slot 20, with the lower shoulder 3 resting on lower lip 26' of rail 18. In this sense, the lower prong 38' is engaged with rail 18, while the upper prong 38 is not engaged with rail 18. However, when subjected to upward wind loads, the washer could shift upward and engage the upper prong 38 with upper rail lip 26.

Figure 32:
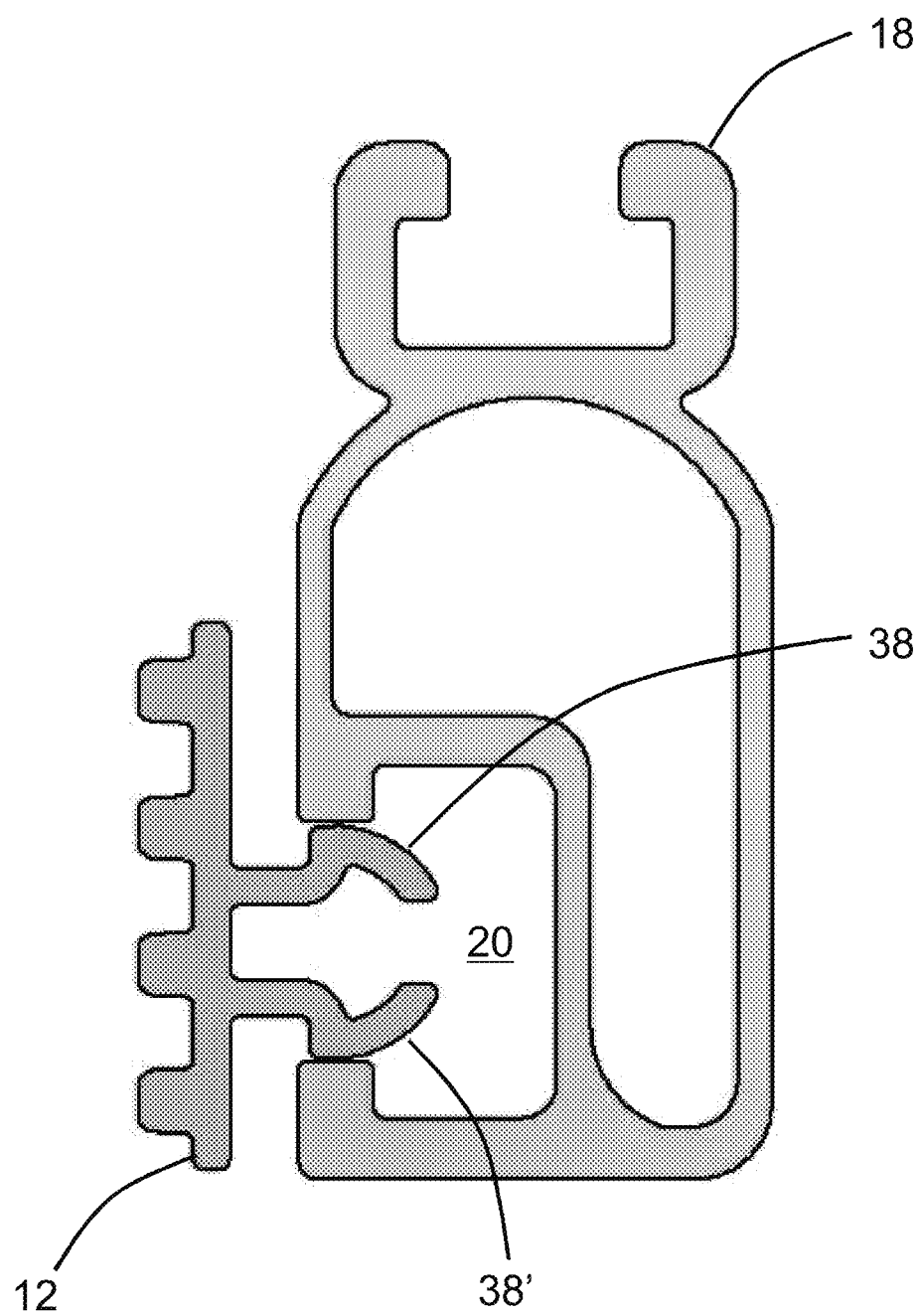
FIG. 32 shows a shaded end view of a first embodiment of an assembly comprising a corrugated washer being installed in a rail, according to the present invention.

FIG. 32 shows a shaded end view of a first embodiment of an assembly comprising a corrugated washer 12 being installed in a rail, according to the present invention. The vertical outer distance between upper and lower prong 38 and 38' just clears the opening for slot 20. Rail 8 is also indicated.

Figure 33A:
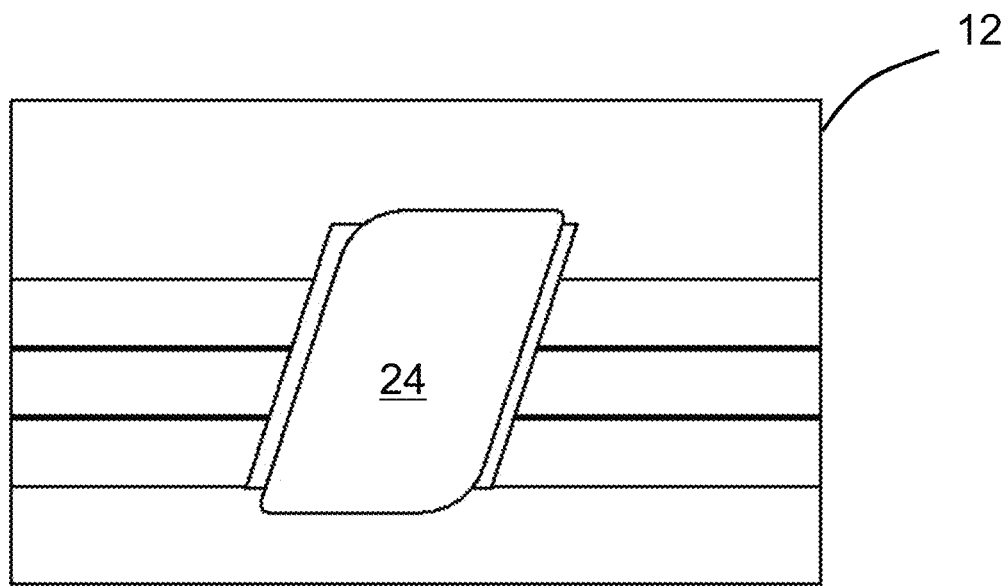
FIG. 33A shows a front elevation view of a first embodiment of an assembly comprising a corrugated washer and a T-bolt, according to the present invention.

FIG. 33A shows a front elevation view of a first embodiment of an assembly comprising a corrugated washer 12 and the head 24 of a T-bolt 14, according to the present invention.

Figure 33B:
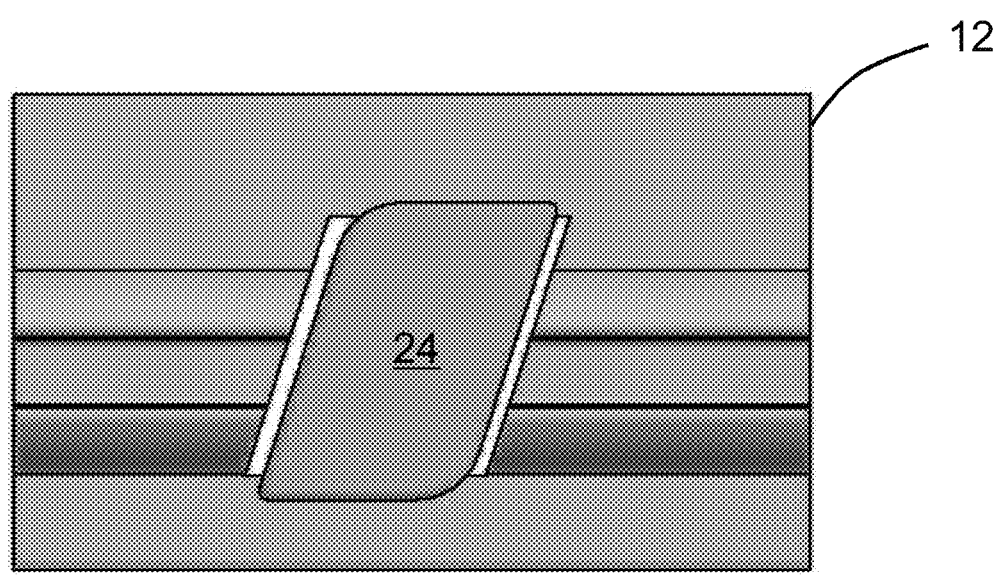
FIG. 33B shows a shaded front elevation view of a first embodiment of an assembly comprising a corrugated washer and a T-bolt, according to the present invention.

FIG. 33B shows a shaded front elevation view of a first embodiment of an assembly comprising a corrugated washer 12 and the head 24 of a T-bolt 14, according to the present invention.

The steps for attaching structural rail 18 to L-foot bracket 10, using corrugated washer 12 and T-bolt 14, are as follows:

Step 1: Mount L-foot bracket 10 to roof surface with lag screw;
Step 2: Insert head 24 of T-bolt 12 into slot 20 of rail 18;
Step 3: Rotate T-bolt 24 approximately 90 degrees until shoulders 49, 49' of head 24 engages lips 26, 26' of slot 20 (this is confirmed by observing visually that orientation mark/groove 40 is vertically aligned);
Step 4: Insert prongs 38 and 38' of washer 12 into slot 20, over protruding shaft of T-bolt 14, wherein lower shoulder 3' of lower prong 38' engages with the lower lip 26' of slot 20;
Step 5: Insert protruding shaft of T-bolt 14 through vertical channel 13 of L-foot bracket 10;
Step 6: Adjust vertical height of rail 18 relative to fixed L-foot 10;
Step 7: Engage and interlock overlapping corrugations 32 and 29 between washer 12 and L-foot bracket 10; and
Step 8: Attach and tighten nut 16 to protruding shaft of T-bolt 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A corrugated washer, comprising:
    a plate with an aperture, the plate having a first corrugated surface, wherein first corrugations of the first corrugated surface extend parallel to each other and are shaped to engage with second corrugations of a second corrugated surface of an L-foot bracket; and
    a pair of prongs that protrude outwards from the plate on a face that is opposite the first corrugated surface,
    wherein the pair of prongs include a first prong and a second prong, and
    wherein the first prong is located at approximately a vertical center of the corrugated washer and the second prong is located below the first prong in a vertical direction.

2. The corrugated washer of claim 1, wherein the prongs are shaped to retain the washer when the washer is inserted into a slot.

3. The corrugated washer of claim 2, wherein each prong has a retaining shoulder for retaining the washer in the slot.

4. The corrugated washer of claim 1, wherein distal ends of the prongs extend completely outwards to an outer width of the plate.

5. The corrugated washer of claim 1, further comprising a gap in the prongs that provides access to the aperture for a rhomboid-shaped head of a T-bolt to pass through.

6. The corrugated washer of claim 1, wherein the aperture is rhomboid-shaped, with a rhomboid angle that ranges from 0 to 45 degrees, selected so that a T-bolt with a mating rhomboid-shaped head is secured in a slot.

7. The corrugated washer of claim 6, wherein the rhomboid angle is 20 degrees.

8. The corrugated washer of claim 1, wherein the plate is rectangular.

9. The corrugated washer of claim 1, wherein the first corrugations protrude outwardly or inwardly from only one face of the plate in a direction perpendicular to the plate.

10. The corrugated washer of claim 1, wherein the corrugations protrude from one face of the plate in a perpendicular direction.

11. A washer configured to pair with an L-foot bracket having a non-planar surface and being interposed between the L-foot bracket and a rail, the washer comprising:
    a plate having a corrugated surface and an aperture therethrough, corrugations of the corrugated surface extending parallel to each other, and the corrugations being shaped to engage with the non-planar surface of the L-foot bracket; and
    a pair of prongs that protrude outwards from the plate on a face that is opposite from the corrugated surface from which the corrugations protrude, the prongs being shaped to retain the washer on the rail when the prongs are inserted into a slot of the rail.

12. The washer of claim 11, wherein distal ends of the prongs extend completely outwards to an outer width of the plate.

13. The washer of claim 11, further comprising a gap in the prongs that provides access to the aperture for a rhomboid-shaped head of a T-bolt to pass through.

14. The washer of claim 11, wherein the aperture is rhomboid-shaped, with a rhomboid angle that ranges from 0 to 45 degrees, selected so that a T-bolt with a mating rhomboid-shaped head is secured in a slot such that the T-bolt is prevented from back-rotating.

15. The washer of claim 14, wherein the rhomboid angle is 20 degrees.

16. The washer of claim 11, wherein the plate is rectangular.

17. The washer of claim 11, wherein the corrugations protrude outwardly or inwardly from only one face of the plate in a direction perpendicular to the plate.

18. The washer of claim 11, wherein each prong has a retaining shoulder for retaining the washer in the slot.

19. The washer of claim 11, wherein the pair of prongs are symmetrical.

\* \* \* \* \*